United States Patent
Shirai

(10) Patent No.: US 8,103,095 B2
(45) Date of Patent: Jan. 24, 2012

(54) INFORMATION PROCESSING APPARATUS AND INFORMATION PROCESSING METHOD

(75) Inventor: Kunihiro Shirai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1001 days.

(21) Appl. No.: 12/039,423

(22) Filed: Feb. 28, 2008

(65) Prior Publication Data

US 2008/0317338 A1 Dec. 25, 2008

(30) Foreign Application Priority Data

Mar. 2, 2007 (JP) ................................. 2007-053338

(51) Int. Cl.
*G06K 9/00* (2006.01)
(52) U.S. Cl. ...................................................... 382/167
(58) Field of Classification Search .................. 382/162, 382/164, 165, 167; 345/591, 593, 600–604; 358/1.9, 518, 520
See application file for complete search history.

(56) References Cited

U.S. PATENT DOCUMENTS

| | | | |
|---|---|---|---|
| 5,515,172 A * | 5/1996 | Shiau | 358/520 |
| 6,768,494 B1 * | 7/2004 | Das et al. | 345/591 |
| 7,054,035 B2 * | 5/2006 | Zeng et al. | 358/1.9 |
| 7,728,886 B2 * | 6/2010 | Ogawa | 348/231.6 |
| 7,880,942 B1 * | 2/2011 | Phillips et al. | 358/518 |
| 2006/0170995 A1 | 8/2006 | Ariga | |

FOREIGN PATENT DOCUMENTS

| | | |
|---|---|---|
| JP | 2003-087591 A | 3/2003 |
| JP | 2004-235768 A | 8/2004 |
| JP | 2006-121321 A | 5/2006 |

* cited by examiner

*Primary Examiner* — Jose Couso
(74) *Attorney, Agent, or Firm* — Canon U.S.A. Inc., I.P. Division

(57) ABSTRACT

An information processing apparatus that suppresses occurrences of color conversions not intended by the user. Information on affected regions for individual color conversion processes applied to an image is stored in the information processing apparatus. The information processing apparatus determines whether or not the affected region of a color conversion process that the user is attempting to apply overlap an affected region of a color conversion process that has already been applied, and if so, informs the user by, for example, displaying the affected regions on a chromaticity diagram.

14 Claims, 24 Drawing Sheets

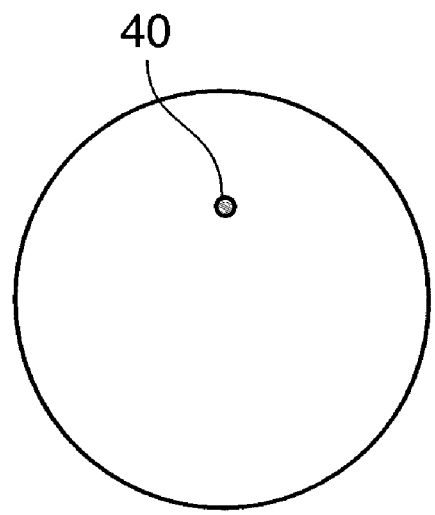
F I G. 4A
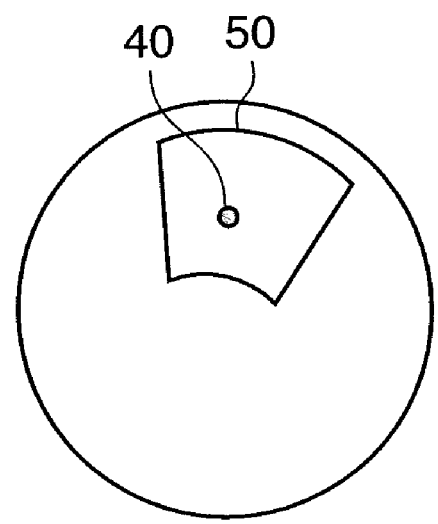
F I G. 4B
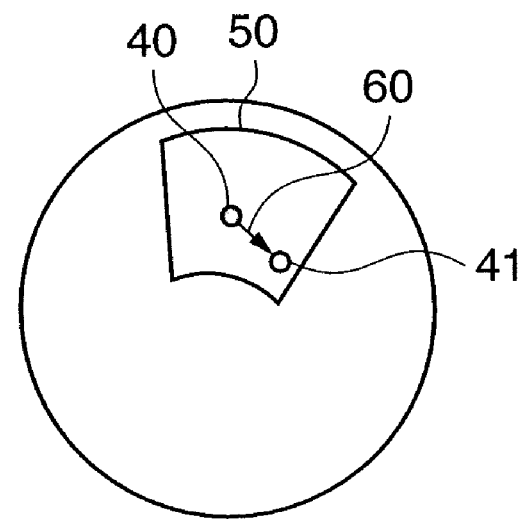
F I G. 4C

F I G. 8

_7004_

| ORDER | ACTIVE FLAG | CONVERSION DATA | CORRELATED DATA |
|---|---|---|---|
| 1 | 1 | ******** | |
| 2 | 0 | ******** | |
| 3 | 1 | ******** | 2 |
| . | . | . | . |
| . | . | . | . |
| . | . | . | . |

FIG. 11C

| ORDER | ACTIVE FLAG | CONVERSION DATA | CORRELATED DATA |
|---|---|---|---|
| 1 | 1 | ********** | |
| 2 | 1 | ********** | |
| 3 | 1 | ********** | |
| 4 | 1 | ********** | 1 |
| 5 | 1 | ********** | |

INFORMATION PROCESSING APPARATUS AND INFORMATION PROCESSING METHOD

BACKGROUND OF THE INVENTION

1. Field of the Invention

The present invention relates to an information processing apparatus and an information processing method, and more particularly, to an information processing apparatus and an information processing method for carrying out color image correction.

2. Description of the Related Art

In recent years, with the spread of digital cameras and other such image sensing apparatuses and improvements in personal computer performance capabilities, users now have more opportunities to retouch digital images to suit their own preferences. Retouching software applications are now sold by many companies, and users can now easily carry out sophisticated image processing as well. For example, even during image correction it is now common to carry out color correction by trial and error while conducting a test print so as to obtain a print of a desired color tone.

Color correction usually requires a procedure in which multiple corrections are repeated for a plurality of colors. For example, in a case of an image of scenery in which a person is present, first the overall brightness is corrected, then the color of the sky, the color of the leaves, the color of the skin and so forth are sequentially corrected to suit one's preferences, and finally an image having the desired color tone is obtained. There are retouching software applications that have the capability to carry out color correction automatically, but they are not perfect and fine adjustment is required to obtain correction results that accord with individual users' needs.

In addition, it is not unusual that, after carrying out correction of one color, while carrying out correction of another color one wishes to re-correct the corrected color. Specifically, in the example described above, after correcting the color of the sky, suppose the color of the leaves is corrected. At this time, if a balance between the corrected color of the leaves and the previously corrected color of the sky is not to one's liking, one will want to re-correct the color of the sky.

When such a correction process is carried out for colors of a variety of different locations, overall optimization becomes difficult. For example, when the color of the sky is corrected, colors of a comparable color hue are affected, with results that the user does not intend.

A common method of preventing color conversions not intended by the user is to limit the correction subject region by color hue/saturation/brightness and correct only that region. However, even with this method, in order to prevent the problem described above it is necessary to store information on the region subjected to correction. Where there are many converted regions it is in reality difficult to fully store the information, and the problem of color corrections not intended by the user remains.

In addition, when re-correcting a once-corrected portion, it is possible to use an undo function, for example, and to return to a past state. However, depending on the size of the image and the content of the erasure process, the computations required to recover would take time and require an enormous memory.

Japanese Patent Laid-Open No. 2006-121321 discloses a technology that, by having a color-space conversion table for each piece of history data, obtains an image of a past state with less memory than with a method that saves an image each time a correction is carried out.

In the technique described in Japanese Patent Laid-Open No. 2006-121321, it is possible to recover an image of a time in the past by sequentially tracing back through the history of corrections carried out in the past from a newest image. However, when color conversion that is different from before is applied to the recovered image, the color-space conversion tables for the color conversions implemented thereafter become invalid. As a result, in order to reproduce the results of the color conversions modified thereafter it is necessary to recalculate. Where the conversion process requires complex calculations, and the further back in the past the recovery, the time required for these calculations lengthens and the problem of lengthened processing time remains.

Further, the problem of color conversions not intended by the user occurring in color conversions of limited regions is not solved by the method of Japanese Patent Laid-Open No. 2006-121321.

SUMMARY OF THE INVENTION

The present invention is conceived in light of the problems of the conventional art described above.

The present invention provides an information processing apparatus and an information processing method that make it possible, for example, to suppress occurrences of color conversions not intended by the user.

Further, the present invention provides an information processing apparatus and an information processing method that make it possible, for example, to reflect modifications simply and easily even when modifying a process that has already been applied.

According to an aspect of the present invention, there is provided an information processing apparatus for applying, to an image, a color conversion process that converts a source color to a destination color. The information processing apparatus includes: a computing unit that computes an affected region that is a region of color converted together with conversion of the source color; a color conversion unit that applies the color conversion process to the image; a storage unit that stores information relating to an affected region of a color conversion process that has already been applied to the image; a discrimination unit that, using the storage unit and the computing unit, determines whether an affected region of the color conversion process that has already been applied and an affected region of a color conversion process to be applied overlap; and a notification unit that, in a case in which it is determined that an affected region of the color conversion process that has already been applied and an affected region of a color conversion process to be applied overlap, informs a user that an overlap has been determined.

According to another aspect of the present invention, there is provided an information processing apparatus for applying, to an image, a color conversion process that converts a source color to a destination color. The information processing apparatus includes: a computing unit that computes an affected region that is a region of color converted together with conversion of the source color; a storage unit that stores information relating to an affected region of a color conversion process that has already been applied to the image; a discrimination unit that, in response to an instruction to modify the color conversion process that has already been applied to the image, uses the storage unit and determines whether there is a color conversion process having an affected region that overlaps an affected region of a color conversion process that is to be subjected to the modification; and a control unit that reflects the instruction in the image by applying a color conversion process to the image based only on calculations relating to the color conversion process that is to be subjected to the modification and to a color conversion process that is determined to have an affected region that overlaps the affected region of the color conversion process that is to be subjected to the modification.

According to a further aspect of the present invention, there is provided an information processing method for applying, to an image, a color conversion process that converts a source color to a destination color. The information processing method includes: computing an affected region that is a region of color converted together with conversion of the source color; applying the color conversion process to the image; storing information relating to an affected region of a color conversion process that has already been applied to the image in a storage unit; using the information relating to the affected region stored in the storage unit and the computed affected region of a color conversion process to be applied and determining whether the affected region of the color conversion process that has already been applied and the affected region of the color conversion process to be applied overlap; and informing a user that, in a case in which it is determined that the affected region of the color conversion process that has already been applied and the affected region of the color conversion process to be applied overlap, an overlap has been determined.

According to yet a further aspect of the present invention, there is provided an information processing method for applying, to an image, a color conversion process that converts a source color to a destination color. The information processing method includes: computing an affected region that is a region of color converted together with conversion of the source color; storing information relating to an affected region of a color conversion process that has already been applied to the image in a storage unit; in response to an instruction to modify the color conversion process that has already been applied to the image, using the storage unit and determining whether there is a color conversion process having an affected region that overlaps an affected region of a color conversion process that is to be subjected to the modification; and reflecting the instruction in the image by applying a color conversion process to the image based only on calculations relating to the color conversion process that is to be subjected to the modification and to a color conversion process that is determined to have an affected region that overlaps the affected region of the color conversion process that is to be subjected to the modification.

Further features of the present invention will become apparent from the following description of exemplary embodiments with reference to the attached drawings.

BRIEF DESCRIPTION OF THE DRAWINGS

FIGS. 4A-4C are diagrams showing display examples of an image correction part shown in FIG. 3;

FIG. 8 is a diagram showing an example of a data structure of color conversions in a color correction history data region;

FIGS. 11A-11C are diagrams illustrating a process of the information processing apparatus according an embodiment of the present invention.

DESCRIPTION OF THE EMBODIMENTS

Exemplary embodiments of the present invention will now be described in detail in accordance with the accompanying drawings.

First Embodiment

A detailed description is given below of embodiments of the present invention, with reference to the drawings.

Figure 1:
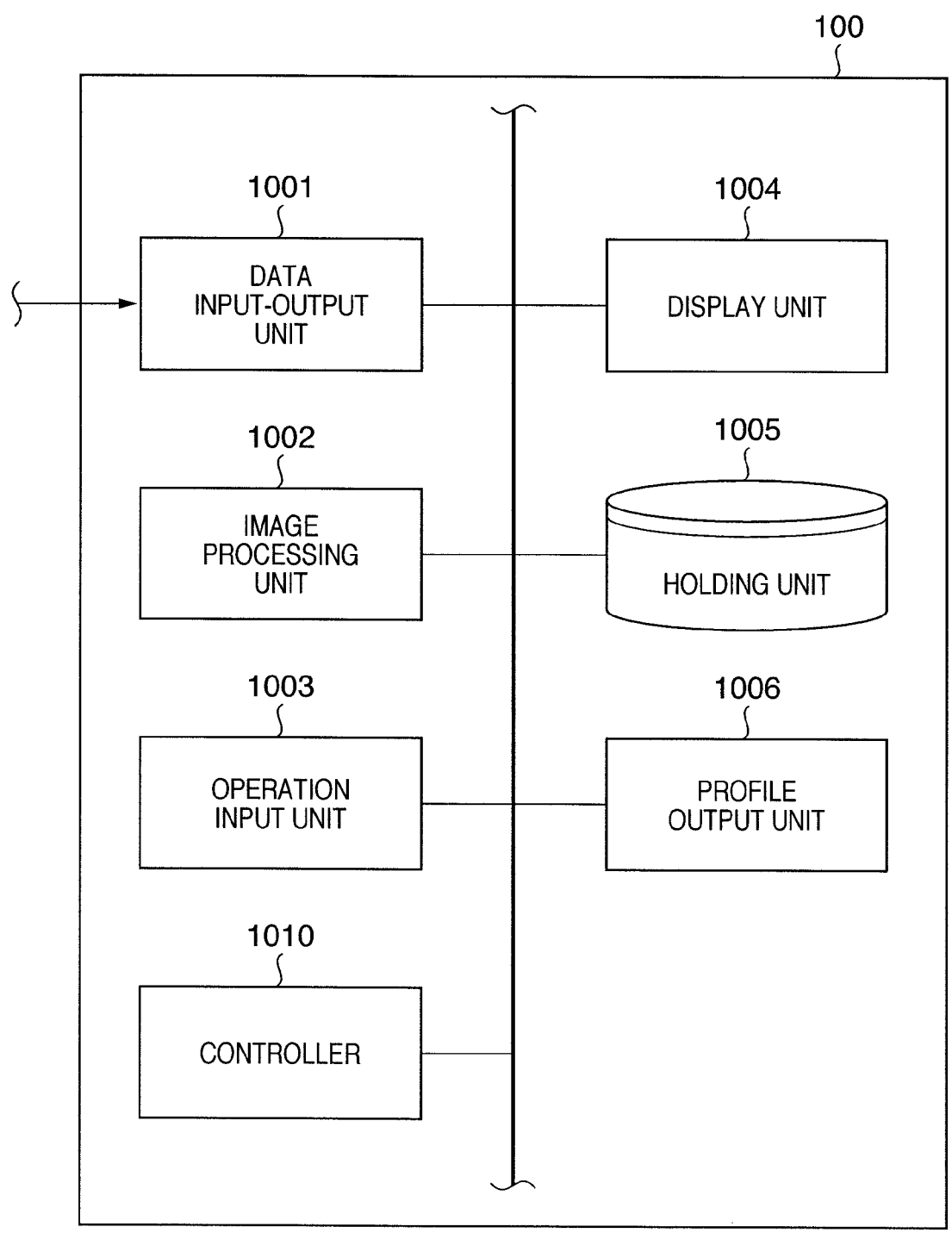
FIG. 1 is a block diagram showing an example configuration of an information processing apparatus according to an embodiment of the present invention.

FIG. 1 is a block diagram showing an example configuration of an information processing apparatus according to an embodiment of the present invention.

In an information processing apparatus 100, a data input-output unit 1001 is a data communications interface for connecting to an external device such as a digital camera or the like. An image processing unit 1002 implements image processing on an image to be subjected to correction (a subjected image). An operation input unit 1003 is an input device for specifying the content of the modification to be carried out on the subjected image, and commonly includes at least one of a keyboard, a mouse, a track ball, a tablet, and so forth.

An instruction input through the operation input unit 1003 is provided to the image processing unit 1002 via a controller 1010 to be described later. The operation input unit 1003 applies calculations in response to the provided instruction to the subjected image. A display unit 1004 includes a display device, and displays a subjected image, an image correction application GUI, and the like.

A holding unit 1005, which is, for example, a non-volatile large-capacity storage device such as a hard disk, stores subjected image and corrected location data, modification histories, profiles before and after correction and the like. The holding unit 1005 may also store image correction applications, operating system software, and the like. A profile output unit 1006 outputs a final correction result profile.

The controller 1010 includes, for example, a CPU, ROM, and RAM, not shown. Loading a program stored in the ROM or the holding unit 1005 into the RAM, executing it by the CPU, and controlling the parts of the apparatus implements the functions of the information processing apparatus of the present embodiment, including various operations to be described later.

The information processing apparatus of the present embodiment carries out color correction using an HSL color space composed of three components, Hue, Saturation, and Luminance, that makes it easy for people to carry out image correction intuitively without depending on the image input-output devices. However, the purpose in doing so is to facilitate description and understanding, and is not intended to limit the scope of application of the present invention. Thus, the present invention is also applicable to a case in which the apparatus is configured to carry out color correction using a color space other than an HSL color space, such as L*a*b*-, XYZ-, and YUV-type color spaces, in the same way as in the case of HSL color space, and achieves the same effect.

The profiles held in the holding unit 1005 and the profiles output by the profile output unit 1006 include color values in the color space used by an output device such as a printer or a display as well as color-space conversion parameters that indicate a correspondence with color values of other color spaces.

Specifically, even when the input device and the output device have different color spaces, the information processing apparatus of the present embodiment can read out the appropriate profile from the holding unit 1005 and can convert the color space appropriately according to the input-output devices. Here, as typical input devices there are digital cameras and image scanners, and as typical output devices there are printers, displays, and the like.

It should be noted that, in order to facilitate the description and the understanding, the following description uses input-output devices having an RGB color space. However, as described above, the present invention is also applicable to a combination in which the input-output devices have different color spaces, as when the input device has an RGB color space and the output device has a CMYK color space.

The color-space conversion parameters are usually expressed in the form of look-up tables (hereinafter "LUT") or matrixes. A description is given of the present embodiment using LUT.

Figure 7:
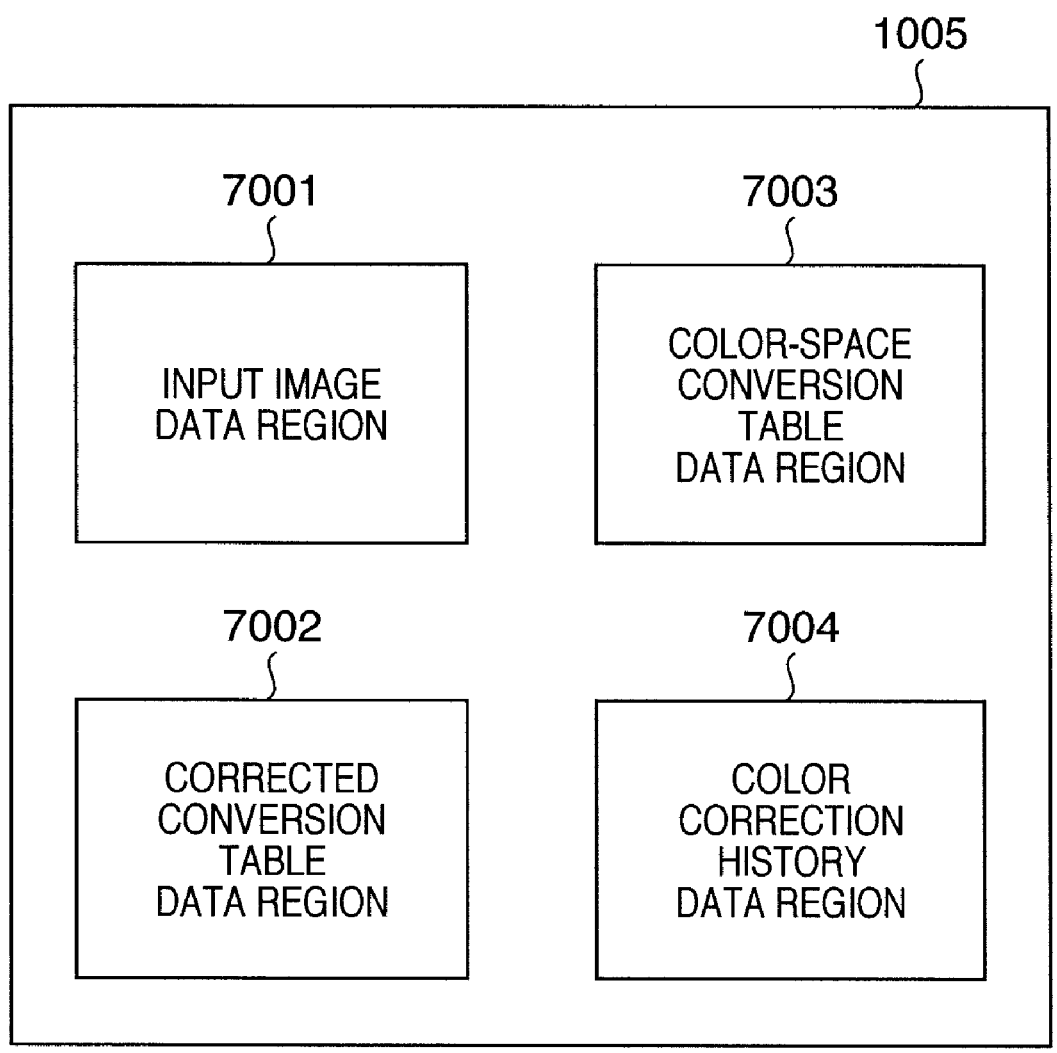
FIG. 7 is a diagram showing examples of various types of data stored in a holding unit of the information processing apparatus according to an embodiment of the present invention, and their storage regions.

FIG. 7 is a diagram showing examples of various types of data stored in the holding unit 1005, and their storage regions.

An input image data region 7001 is a region that contains input image data input for example through the data input-output unit 1001. A corrected conversion table data region 7002 stores a conversion table after correction. A color-space conversion table data region 7003 contains color-space conversion table data. A color correction history data region 7004 contains multiple pieces of color correction history data.

It should be noted that although in FIG. 7 the regions are shown schematically as independent, the regions may be parts of a continuous storage region or they may be stored in the form of one or more data files. In addition, data other than that shown in FIG. 7 may be stored in the holding unit 1005.

Operation

Figure 2:
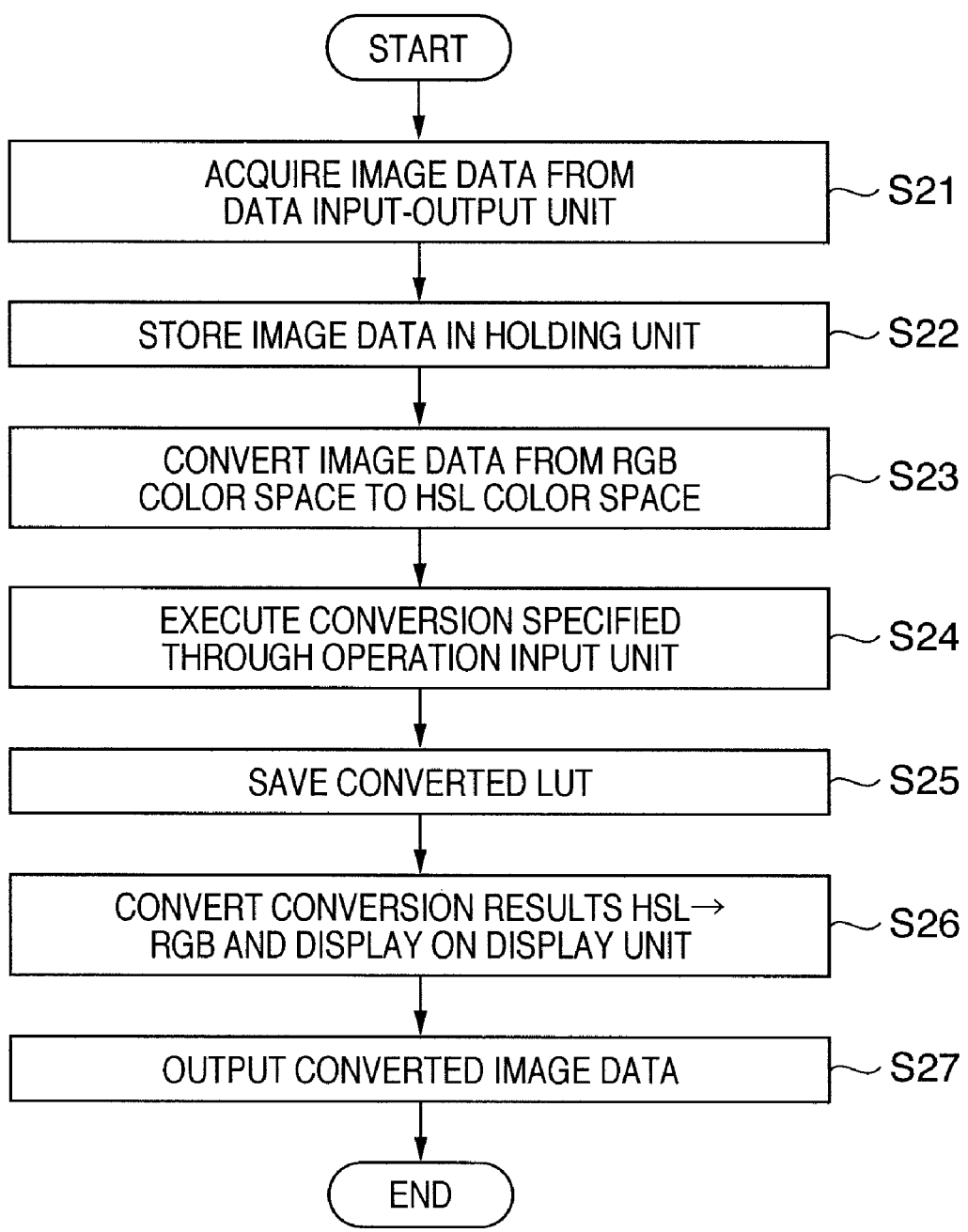
FIG. 2 is a flow chart illustrating steps in an overall process of a color conversion process that is one example of an image correction process of the information processing apparatus according to an embodiment of the present invention.

A description is now given of steps in an overall process of a color conversion process that is one example of an image correction process of the information processing apparatus according to the present embodiment, with reference to the flow chart shown in FIG. 2.

The controller 1010 acquires image data from an input device (such as a digital camera) connected to the data input-output unit 1001 (S21), and records the image data in the input image data region 7001 of the holding unit 1005 (S22).

As described above, in the present embodiment the input device uses an RGB color space, and therefore the acquired image data is also recorded in RGB color space. Therefore, the controller 1010, using an RGB→HSL color-space conversion LUT stored in the color-space conversion table data region 7003 of the holding unit 1005, causes the image processing unit 1002 to carry out a color conversion process (S23).

The controller 1010, using an HSL→RGB color-space conversion LUT that the holding unit 1005 has, causes the image processing unit 1002 to reconvert the image data converted into HSL color space once again into RGB color space. Then, the controller 1010 displays on the display device of the display unit 1004 the image data together with a GUI for operational use. The GUI for operational use is described later with reference to FIG. 3.

Using the operation input unit 1003 and operating the GUI, a user specifies the content of the image retouching (in this case, color correction) that is to be applied to the image data displayed on the display unit 1004.

The color correction content specified through the operation input unit 1003 is provided to the image processing unit 1002 through the controller 1010. The image processing unit 1002 applies the color conversion process to the image data in accordance with the specified content thus provided (S24).

Normally, these steps are often carried out several times. However, each time, the controller 1010 records the converted LUT in the corrected conversion table data region 7002 of the holding unit 1005 (S25). Then, each time correction is carried out, the color converted results are converted into an RGB color space as described above and displayed on the display device of the display unit 1004 (S26).

S24-S26 are repeated as necessary. In addition, if necessary, the affected data is modified to an appropriate color space and output. In the case of the printer as an example of the output device, when an output instruction is provided, the image data is modified from HSL color space to CMYK color space and output through the data input-output unit 1001 (S27).

Figure 3:
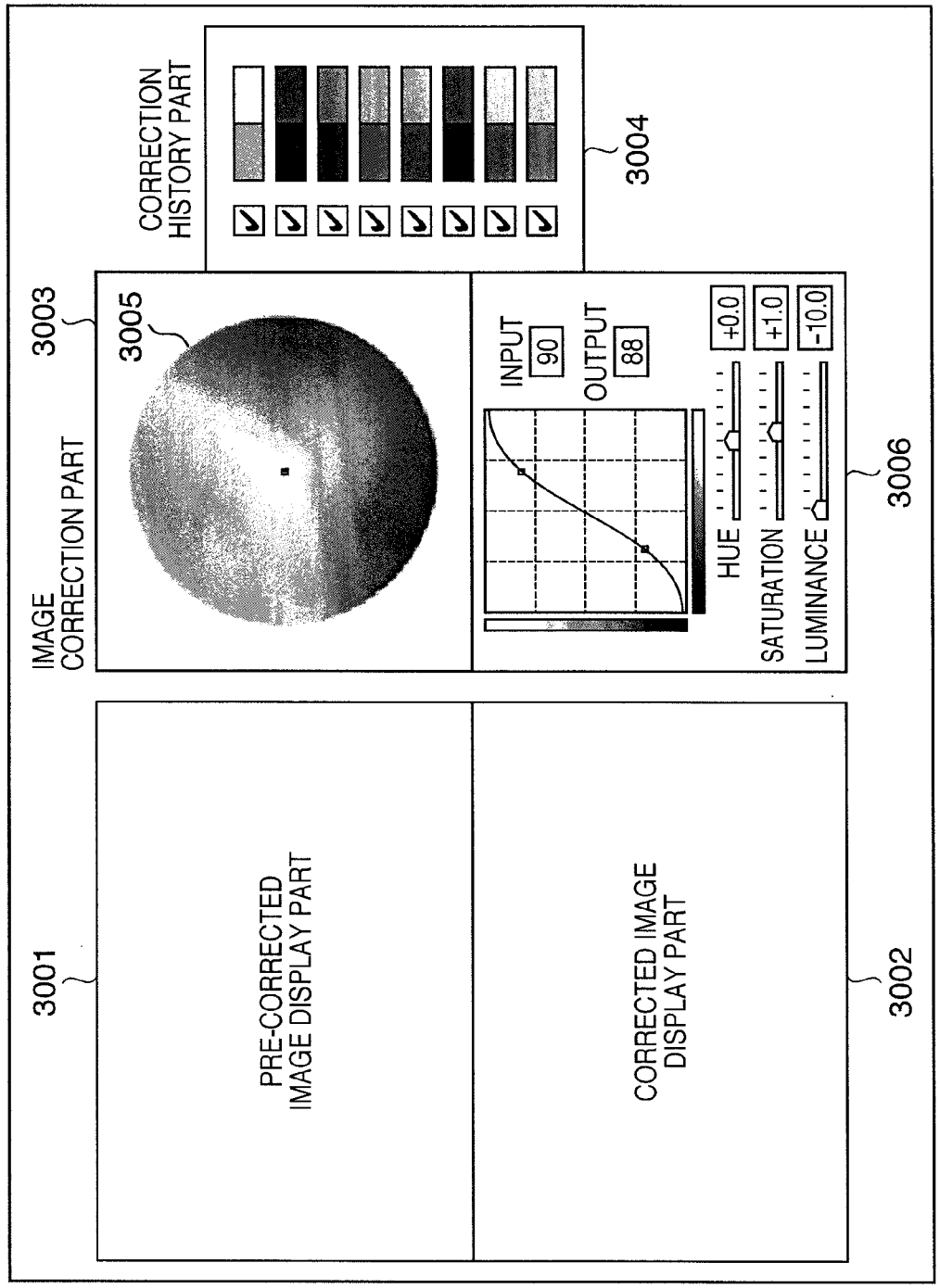
FIG. 3 is a diagram showing an example graphical user interface (GUI) that the information processing apparatus according to an embodiment of the present invention displays together with a subjected image on a display unit.

FIG. 3 is a diagram showing an example of a GUI that the information processing apparatus according to embodiments of the present invention displays together with a subjected image on the display unit 1004.

The GUI shown in FIG. 3 is composed mainly of four parts:

a pre-corrected image display part 3001 that displays an original image before correction;

a corrected image display part 3002 that displays a corrected image after correction;

an image correction part 3003 comprising a correction-use GUI for specifying correction content; and a correction history part 3004 for displaying correction history.

In the pre-corrected image display part 3001 a subjected image before correction is displayed. In the description of the process shown in FIG. 2, after conversion into HSL color space, there is a re-conversion back into RGB color space and the subjected image is displayed. Alternatively, however, in S22 before conversion to the HSL color space, the subjected image may be displayed in the pre-corrected image display part 3001.

Based on this image, the user operates the correction-use GUI of the image correction part 3003 with the operation input unit 1003 and provides the information processing apparatus 100 with such instructions as specification of the color (the source color) to be modified, specification of the color after modification (the destination color), and specification of the region to be modified.

In response to these instructions, calculations are carried out at the image processing unit 1002 and an LUT according to the instructions is created, and at the same time corrections according to the instructions are applied to the subjected image. Application results are converted into an RGB color space and displayed in the corrected image display part 3002 (S25→S26).

Subsequently, the controller 1010 causes color modification histories to be displayed in the correction history part 3004, and at the same time stores details of the modification histories in the color correction history data region 7004 of the holding unit 1005. In the present embodiment, the color modification histories are expressed in the present embodiment as a rectangle painted in the pre-converted color (source color) and, to the right thereof and adjacent thereto, a rectangle painted in the post-converted color (destination color). Therefore, the correction history part 3004 in the example shown in FIG. 3 shows that color conversion processes were carried out eight times.

A more detailed description is now given of the correction-use GUI of the image correction part 3003 of the present embodiment.

The user specifies the color he/she wishes to modify in the original image displayed in the pre-corrected image display part 3001 using a pointing device (for example a mouse) included in the operation input unit 1003.

The controller 1010 acquires the color of the pixels of the position specified and displays a corresponding point 40 in a chromaticity diagram (color wheel) 3005 for example as shown in FIG. 4A. The chromaticity diagram may be of another format, provided that such other format can express a particular color using two-dimensional coordinates.

At this point, the inside of the point 40 is painted in the source color so that the source color can be easily identified. Next, the controller 1010 computes from predetermined conditions an affected region of color in a case in which the hue, saturation, and luminance of the specified source color are modified, and displays that region on the color wheel 3005. The frame 50 shown in FIG. 4B indicates a region of color determined to be affected when the source color indicated by the point 40 is modified.

It should be noted that the frame 50 is an initial value that the controller 1010 computed and which can be changed by the user by for example by dragging one of the four sides. When the frame 50 is modified, the controller 1010 records modifications of the region that correspond to manipulation of the frame 50 on the GUI.

After, specifying the source color, the user specifies the post-modification color (destination color). In the present embodiment, as a method for specifying the destination color, it is possible to use both a method that specifies using a correction slider 3006 and a method that specifies directly on the color wheel 3005.

For example, in a case in which the correction slider 3006 is used, the user can specify a desired destination color for a color by laterally sliding three sliders for hue, saturation, and luminance included in the correction slider 3006. The color that corresponds to the position of the correction slider 3006 may be shown as a point in the color wheel 3005 or it may be shown by providing a separate region for confirming the destination color.

By contrast, in a case in which specification is made directly on the color wheel 3005, by specifying a point on the color wheel 3005 with a mouse pointer, for example, the destination color can be specified. The point expressing the destination color specified on the color wheel 3005 (such as point 41 in FIG. 4C) can be moved with the mouse pointer. In FIG. 4C, in order to make clear the relation between the source color and the destination color, an arrow 60 leading from the point 40 expressing the source color to the point 41 expressing the destination color is displayed.

When application of the specified color conversion is instructed, for example from an application menu (not shown), the controller 1010 determines that execution of the conversion of the source color and the destination color specified at that point in time is confirmed, and executes creation and saving of the LUT and display of the color conversion process and the conversion results, all described above.

It should be noted that the creation of the LUT and the display of the color conversion process and the conversion results may be carried out each time the source color or the destination color are modified, enabling the user to determine the source color and the destination color while checking the conversion results before confirming the color conversion. In this case, the LUT and the color conversion results when an instruction to the effect that specification of the source color and the destination color is finished is input through the operation input unit 1003 are saved in the holding unit 1005 as information corresponding to the confirmed color correction. In addition, at the point in time at which the correction content is confirmed, the history is saved and displayed in the correction history part 3004.

When a conversion process for one source color using the process described above is finished, thereafter the same process is sequentially repeated until an image of a color tone that the user desires is finally achieved. However, as the number of times the conversion process is carried out increases, it becomes difficult to tell what has been modified and what has not been modified just by displaying the histories showing the conversion between the two points consisting of the source color and the destination color.

If the user then inadvertently further modifies a region that has been modified previously, the following sort of phenomenon occurs, leading to a color conversion against the user's intention.

FIGS. 5A-5D show an occurrence of a conversion not intended by the user, in a case in which a region of a color conversion previously determined by the user and a region of a newly carried out conversion overlap.

Figure 5A:
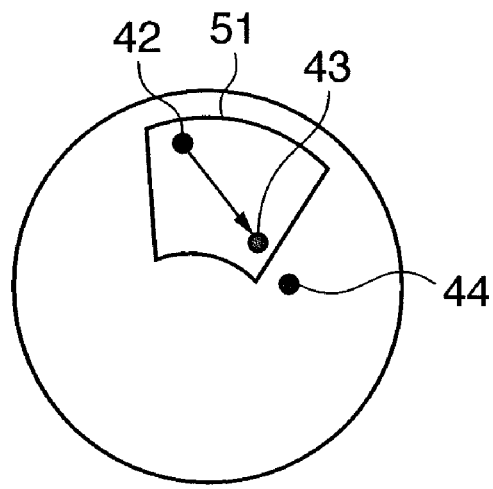
FIGS. 5A-5D are diagrams showing display examples of the image correction part shown in FIG. 3.

First, assume that, in a state in which a first color conversion process (source color 42→destination color 43) is finished as shown in FIG. 5A, the user specifies a new source color 44 on the color wheel 3005. At this time, the new source color 44 need not be included in a frame 51 affected by the first color conversion process.

Figure 5B:
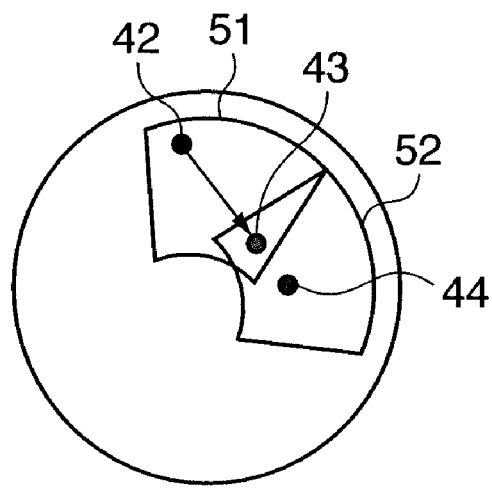
Figure 5C:
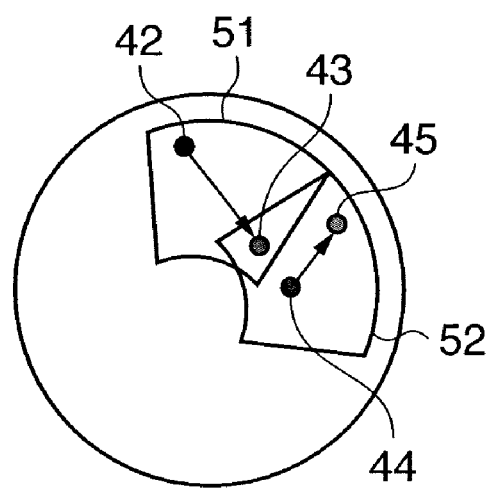

With the specification of the new source color 44, the controller 1010 displays a frame 52 indicating the initial value of the affected region affected by the modification of the new source color 44 (FIG. 5B). The region indicated by frame 52 overlaps the frame 51 indicating the affected region affected by the color conversion process finished first. Assume that, in this state, a destination color 45 for the new source color 44 is specified (FIG. 5C). By doing so, a color conversion process is carried out by the image processing unit 1002 on the color indicated by the frame 52.

Figure 5D:
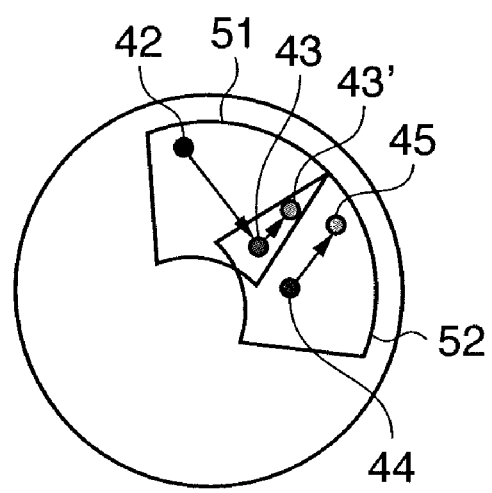

At this time, because the destination color 43 of the conversion process finished first is included in the affected region affected by the current color conversion process (source color 44→the destination color 45), it is affected by the current color conversion process and the destination color 43 changes to, for example, a color 43' (FIG. 5D).

In other words, if the user does not realize that the destination color specified in a color conversion process carried out in the past is affected by a later color conversion process, there is a possibility that a color conversion not intended by the user will be carried out. As the number of color conversions increases and the relation to past conversion processes becomes complicated, it is likely that it will become very difficult for the user to make correct determinations.

Accordingly, the information processing apparatus of the present embodiment, when a new source color is specified, determines whether or not an affected color region affected by modifying the new source color and an affected color region affected by a color conversion process carried out in the past overlap, and by displaying results according to the results of that determination informs the user that there is a possibility of the problem described above occurring.

Figure 6A:
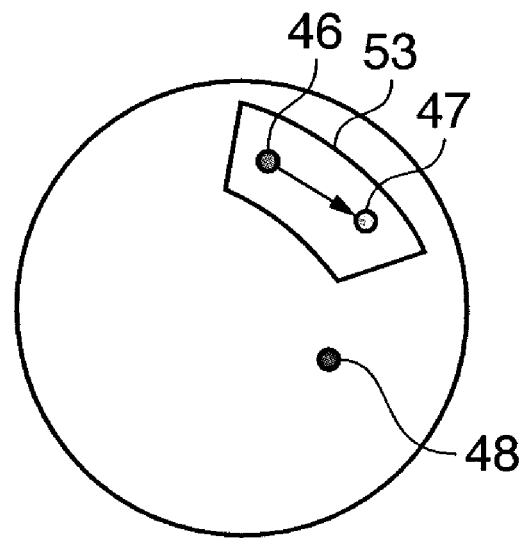
FIGS. 6A and 6B are diagrams showing display examples of the image correction part shown in FIG. 3.
Figure 6B:
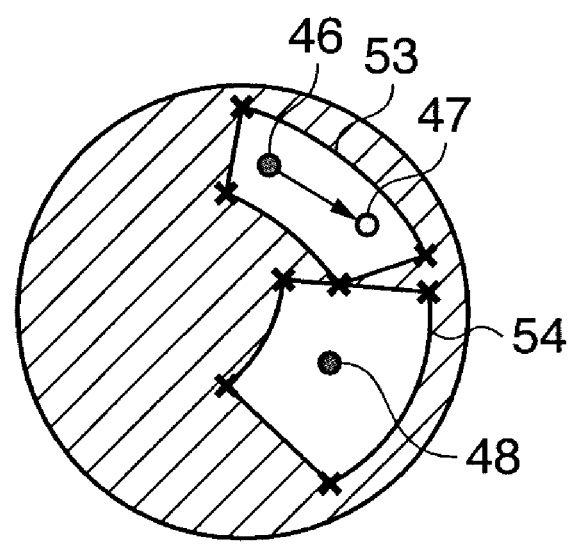

A description is given of a specific example of this notification method, with reference to FIGS. 6A and 6B.

First, in a case in which there is a previously conducted color conversion process (source color 46→destination color 47 in frame 53), a new source color 48 is specified (FIG. 6A). It should be noted that although in FIG. 6A the previously conducted color conversion process is displayed, it may be not displayed.

With the specification of a new source color 48, the controller 1010 computes an initial affected region of color affected by modification of the new source color 48, and displays that region as a frame 54. Then, the controller 1010 detects that the frame 54 overlaps the frame 53 indicating the affected region affected by the earlier color conversion.

To inform the user of the overlap, in the color wheel 3005 the controller 1010 makes all the overlapping regions (frame 53 and frame 54) active and grays out display of the other regions (FIG. 6B). To make a region active means to display it in such a way that the user can revise the range of the region (that is, its size, shape, and location).

The display shown in FIG. 6B enables the user to easily and clearly recognize that the initial affected region of color affected when the newly specified source color 48 is converted overlaps an affected region of color affected by a past color conversion.

Further, since the affected region affected by the color conversion is displayed so that it can be modified, it can be modified so that, for example, the affected region of color affected by modification of the new source color 48 does not overlap with another affected region of color affected by another color conversion.

Before proceeding to a detailed description of the process for achieving the displays shown in FIGS. 6A and 6B, a description is given using FIG. 8 of an example of a data structure of color conversions in the color correction history data region 7004.

The color conversion history data stores the following types of parameters for each color conversion process:

numbers arranging the color conversions in chronological order;

active flags indicating whether or not the conversion is valid;

conversion data indicating correction information needed for conversion (or an address where such information is saved); and correlation data indicating region overlap information.

The numbers, for example, 1, 2, . . . and so forth, show the order of conversion in chronological order, in the order in which the conversions were carried out. The active flag indicates whether a given conversion is valid or invalid, and is "1" when the conversion is valid. For example, once a check in a check box in the correction history part 3004 shown in FIG. 3 is removed, the value of the active flag of the corresponding conversion process is changed to "0".

The conversion data is data such as coordinates of the source colors and the destination colors of the color conversion processes, the affected region (a source color and a surrounding region converted as a result of color conversion of the source color) and the like, or an address containing that data.

The correlation data is data that shows overlap with another affected region. In a case in which there is an overlap with an affected region of a color conversion process carried out prior to the conversion process in question (that is, a color conversion process with a smaller value for the number), the value of the number for the color conversion process having an affected region that it overlaps is stored.

Figure 9:
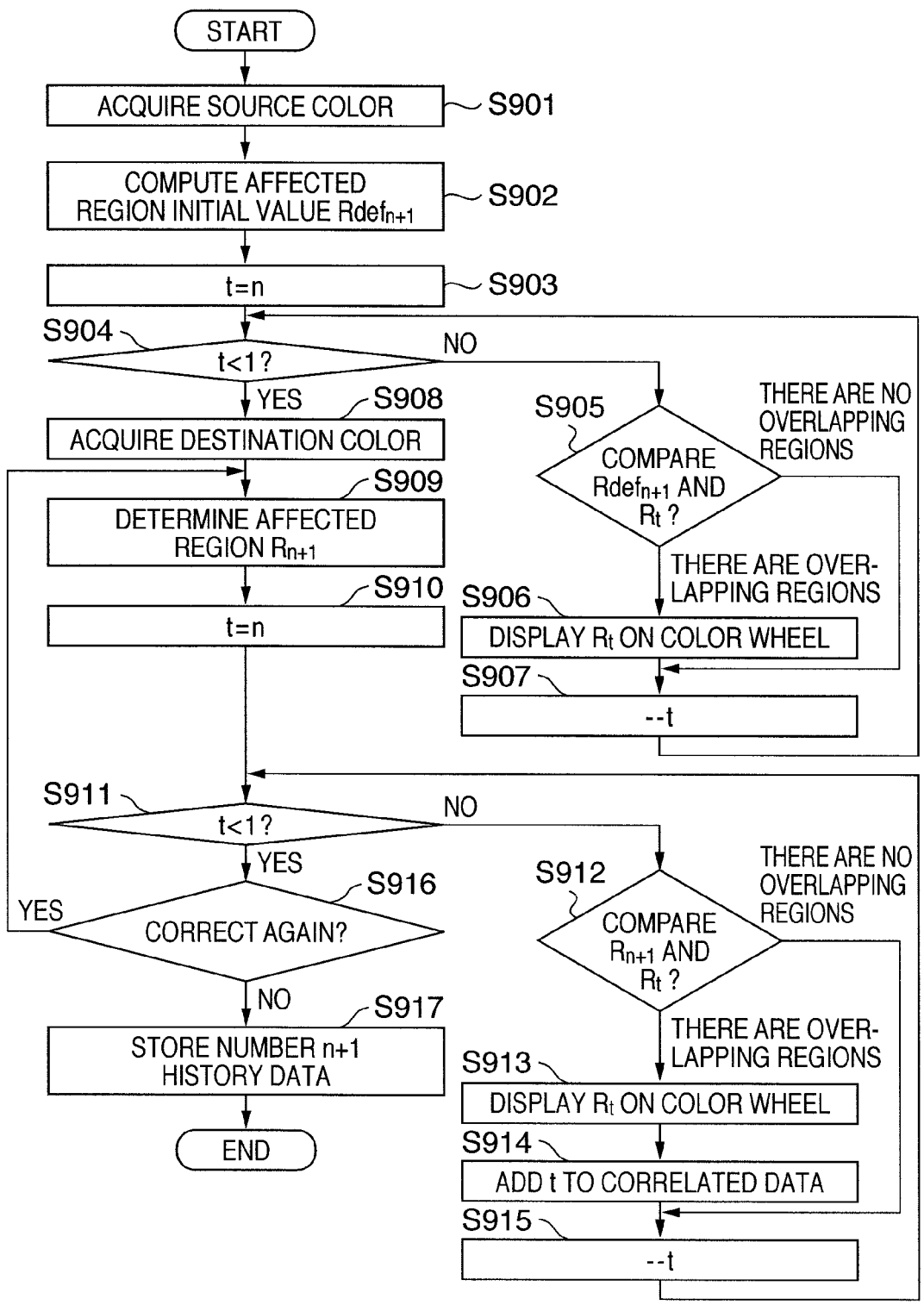
FIG. 9 is a flow chart illustrating a process for carrying out the displays shown in FIGS. 6A and 6B.

Using the flow chart shown in FIG. 9, a description is now given of a procedure for implementing the display method shown in FIGS. 6A and 6B using color correction history data having the structure described above. The flow chart shown in FIG. 9 is executed by the controller 1010 as a part of the process of S24 shown in FIG. 2.

First, the controller 1010 acquires a source color specified by the user (S901). Here, the color correction process is a $(n+1)^{th}$ process (where $n \geq 1$).

As described above, once the source color is specified, the controller 1010 computes an initial value $Rdef_{n+1}$ for the region of color to be converted along with the conversion of the source color (affected region), and displays it on the color wheel 3005 (S902). Then, the controller 1010 substitutes n for a variable t used in overlap survey (S904). The affected region initial value $Rdef_{n+1}$ may be computed in any way, provided that from the source color the hue, saturation, and luminance can be computed as a color region within a predetermined range.

The controller 1010 checks an affected region $R_t$ of a $t^{th}$ color conversion process and compares it to the current ($(n+1)^{th}$) affected region $Rdef_{n+1}$ (S905). If as a result it is determined that the affected region $R_t$ and the affected region $Rdef_{n+1}$ do not overlap, processing proceeds to S907. If it is determined that the affected regions do overlap, the affected region $R_t$ is displayed on the color wheel 3005 as shown in FIG. 6B (S906).

In S907, the controller 1010 decrements the value of the variable t by 1, returns the process to S904 and repeats its investigation of affected region overlap up to an initial color conversion process affected region $R_1$.

Once the comparison of the affected region $R_1$ and the affected region $Rdef_{n+1}$ is finished, at S907 t=0 and the process moves from S904 to S908. At this point, an initial region of the affected region that corresponds to the specified source color and all affected regions according to past color conversion processes having an overlap with this initial region are displayed on the color wheel 3005.

The user determines the destination color while referring to the affected regions displayed on the color wheel 3005. Once there is a specification of a destination color, the controller 1010 acquires the destination color (S908). In addition, as described above the controller 1010 also displays a processing result image in the corrected image display region.

The user can change the size and move the location of the initial region of the affected region $R_{n+1}$ by dragging the displayed frame lines or the like. Where the size or location of the affected region $R_{n+1}$ has been changed, the controller 1010 determines the affected region $R_{n+1}$ after modification according to user operation (S909).

Subsequently, the controller 1010, as in S903 to S907, determines an overlap relation between the newly determined affected region $R_{n+1}$ and the affected region $R_t$ ($n \geq t \geq 1$) and updates the display on the color wheel 3005 (S910 to S915).

At this point, the controller 1010 stores the value for the order of a color conversion process having an affected region that overlaps the affected region $R_{n+1}$ in the correlated data of the $n^{th}+1$ color correction history data (S914).

Subsequently, if the affected region $R_{n+1}$ and is further modified, the controller 1010 returns the process to S909 via S916 and repeats determining the overlapping affected regions as well as updating the display and updating the color correction history data.

When confirmation of the correction content is instructed, for example from a menu or the like, the controller 1010 records in the $n^{th}+1$ color correction history data such above-described information as source color and destination color information, affected region information, and so forth (S917), and ends the process.

Thus, as described above, the present embodiment determines whether or not a region of color that is converted by a color conversion process that is to be carried out overlaps a region of color converted by a color conversion process carried out in the past and informs the user whenever it determines that there is an overlap, thus enabling a color conversion not intended by the user to be prevented before it is carried out.

In addition, by displaying on a color wheel a plurality of overlapping affected regions in such a way that the affected regions can be revised, the user can easily modify the affected regions so as to eliminate the overlap.

It should be noted that although a description has been given of a case in which, of the affected regions of past color conversion processes, those affected regions that have an overlap with the affected region of the color conversion process to be carried out are displayed on the color wheel. However, provided that the basic objective of informing the user is achieved, it is possible to use any other method. Thus, for example, in a case in which an overlap of the affected regions is determined, the user may be informed by displaying a warning message in a window, or the user may be informed by an audible alarm.

Moreover, the information processing apparatus of the present embodiment merely informs the user of an affected region overlap, and leaves to the user the determination as to whether or not to modify the affected regions. However, the apparatus may be configured so that, when an overlap is detected, it automatically modifies the affected region so as not to overlap. The modification method may be by any method, one example of which may be, for example, a method that reduces the affected region of the color conversion process to be carried out so that it does not overlap with the affected regions of color conversion processes carried out in the past.

In addition, matters may be arranged so that whether or not to carry out such automatic revision of the affected region is switchable by user setting.

Second Embodiment

A description is now given of an information processing apparatus according to a second embodiment of the present invention.

In the second embodiment, the functional configuration of the information processing apparatus may be the same as that of the information processing apparatus of the first embodiment shown in FIG. 1, and therefore a description thereof is not repeated.

When carrying out multiple times the image revisions described in the first embodiment, specifically, the color conversion processes, the modification histories for each time are displayed in the correction history part 3004 shown in FIG. 3. By manipulating the correction history part 3004, the user can add any modification to color conversion processes executed in the past. Examples of such modification might include invalidating previously carried out color conversion processes; conversely, revalidating a color conversion previously invalidated; and changing the destination color of a color conversion process previously carried out.

As noted as a problem of the conventional art, usually, when modifying an $n^{th}$ color conversion process, the $n^{th}+1$ and subsequent color conversion processes were sequentially redone. The reason is that the design is based on a recognition that a color conversion process in one place in the order requires the results of color conversion process carried out previously.

However, not all the pixels included in the subjected image are affected by the color conversion process. For example, even if the color conversion process has been carried out multiple times, in a case in which the affected regions of the individual color conversion processes do not overlap, each one can be thought of as an independent color conversion process.

Figure 10A:
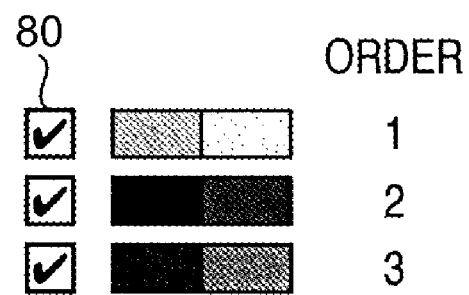
FIGS. 10A and 10B are diagrams illustrating a process of an information processing apparatus according to a second embodiment of the present invention.
Figure 10B:
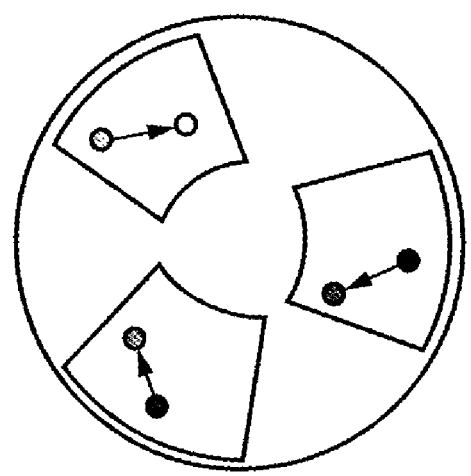

Specifically, assume that color conversion processes have been applied to a subjected image three times. In this case, a display like that shown in FIG. 10A is shown in the correction history part 3004. If relations among the affected regions of the three color conversion processes shown in FIG. 10A are such that they do not overlap as shown in FIG. 10B, the color conversions are independent and regardless of their order are not affected by other color conversion processes (nor do they affect others). Therefore, so long as the color conversion processes maintain their mutual independence, even if the color conversion processes are modified, it is not necessary to redo other color conversion processes.

Figure 10C:
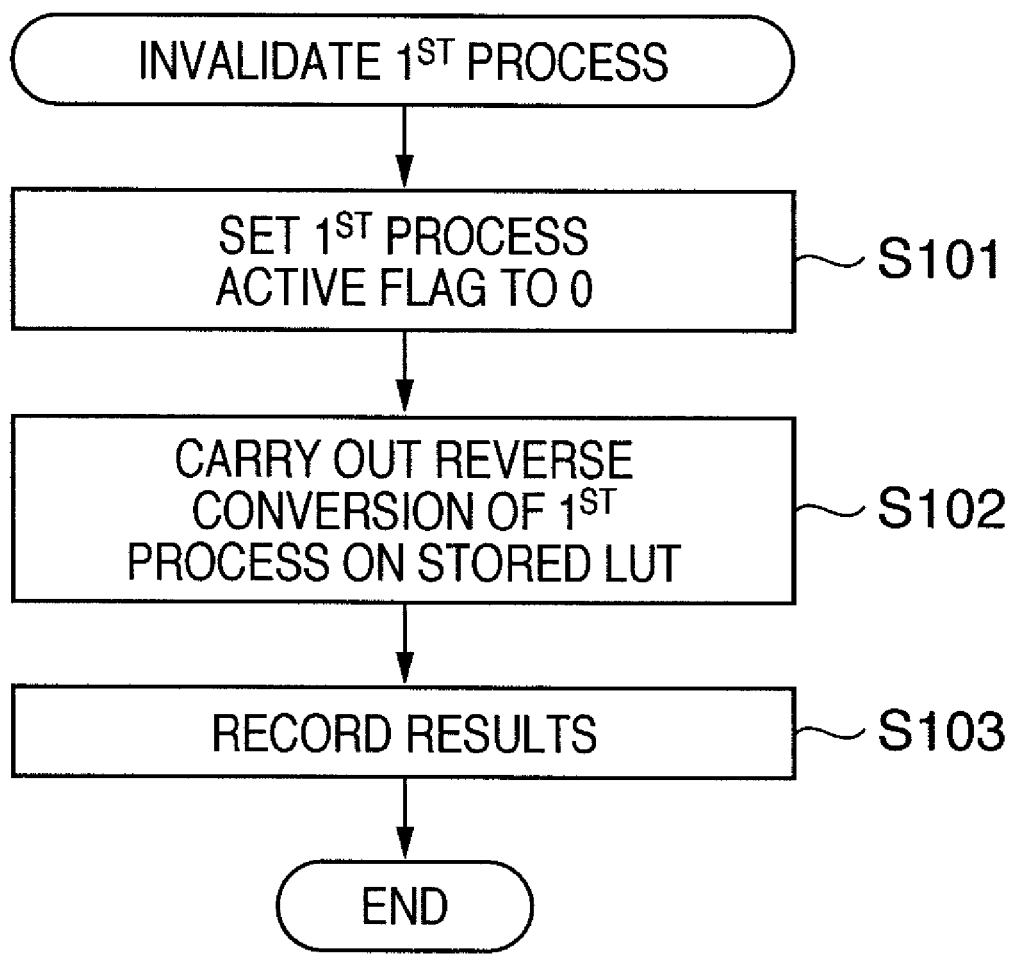
FIGS. 10C-10E are flow charts illustrating the process of an information processing apparatus according to an embodiment of the present invention.

For example, in a case in which a modification is carried out that invalidates the first color conversion process shown in FIG. 10A, a process like that shown in FIG. 10C may be carried out.

The user can provide an invalidation instruction that invalidates the first color conversion process by removing the check from the check box 80 or the first color conversion process in the correction history part 3004. The controller 1010 then carries out the following process in response to the invalidation instruction.

The controller 1010, once it recognizes that the check has been removed, in order to invalidate the first color conversion process, sets the first color correction history data active flag to 0 (S101). Next, the controller 1010 carries out a reverse conversion of the first color conversion process on the LUT stored in the corrected conversion table data region 7002 (S102). A reverse conversion is a computation that switches the source color and the destination color in the color conversions, that is, a makes the destination color the source color and the source color the destination color, and calculates.

Moreover, at this time, the controller 1010 carries out the same reverse conversion on the subjected image displayed on the corrected image display part 3002 and updates the display. Subsequently, the controller 1010 stores the LUT of results of the reverse conversion in the corrected conversion table data region 7002 (S103). Thus is invalidation of the first color conversion process accomplished.

Thus, as described above, in a case in which the affected regions of the individual color conversion processes are independent and do not overlap, even when one color conversion process is invalidated it is not necessary to redo the other color conversion processes, enabling processing time to be greatly reduced and processing load to be greatly decreased. In addition, when one process is invalidated, the color correction histories data correlated data is checked. If the corresponding number is not stored there, there is no effect on the other processes, thus making processing relating to the determination of overlap very easy, and capable of being carried out rapidly.

Figure 10D:
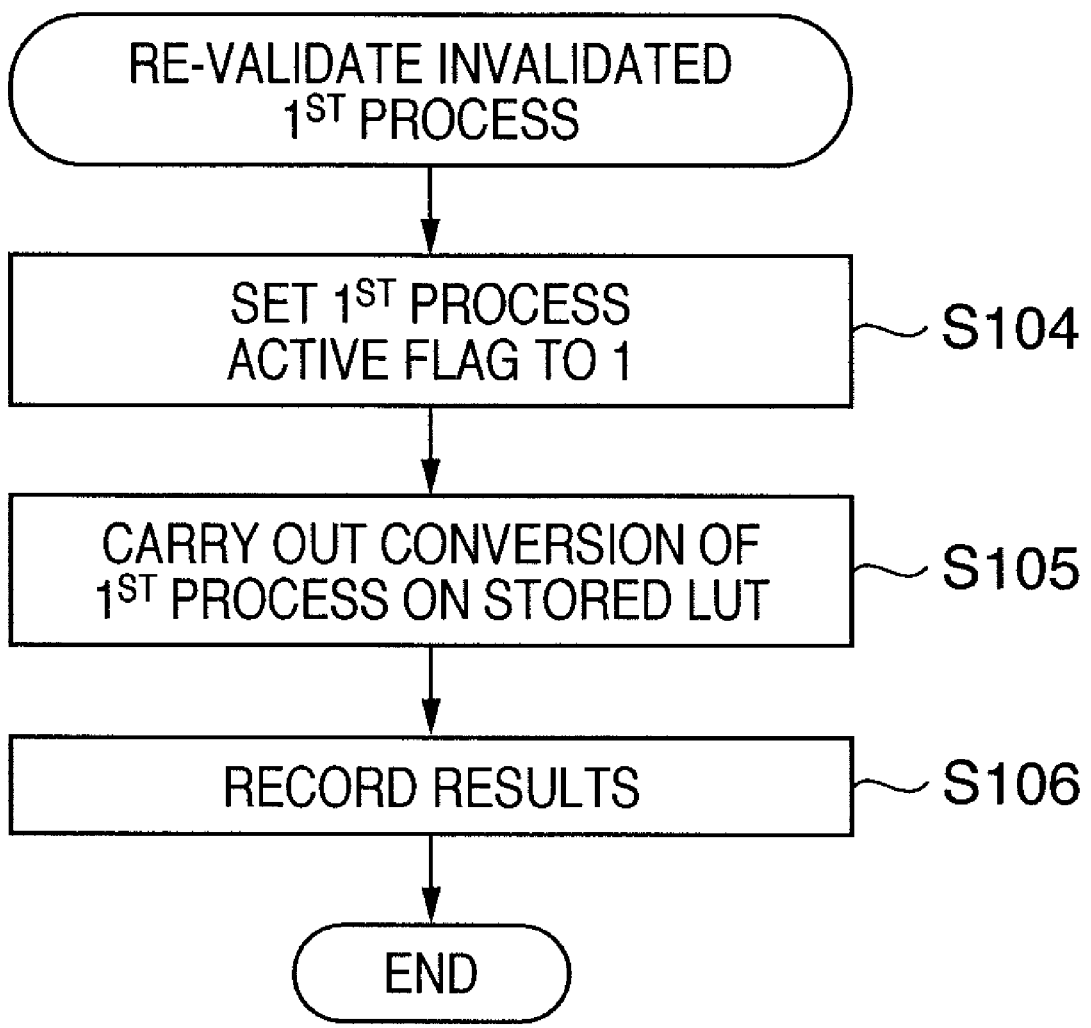

In a case in which the first color conversion process has been invalidated once is to be made valid again, the user can provide a validation instruction for the first color conversion process by checking the check box for the first color conversion process. In response to the instruction, the controller 1010 then carries out the process shown in the flow chart shown in FIG. 10D.

First, the controller 1010 sets the first color correction history data active flag to "1", making the first color conversion process valid (S104). Next, the controller 1010 carries out a conversion of the first color conversion process on the LUT stored in the corrected conversion table data region 7002 (S105), and stores the results in the corrected conversion table data region 7002 (S106), thus enabling a conversion that had been invalidated to be made valid promptly. Here, too, during conversion of the LUT a conversion process is applied to image data for display, and the display on the corrected image display part 3002 is updated.

Figure 10E:
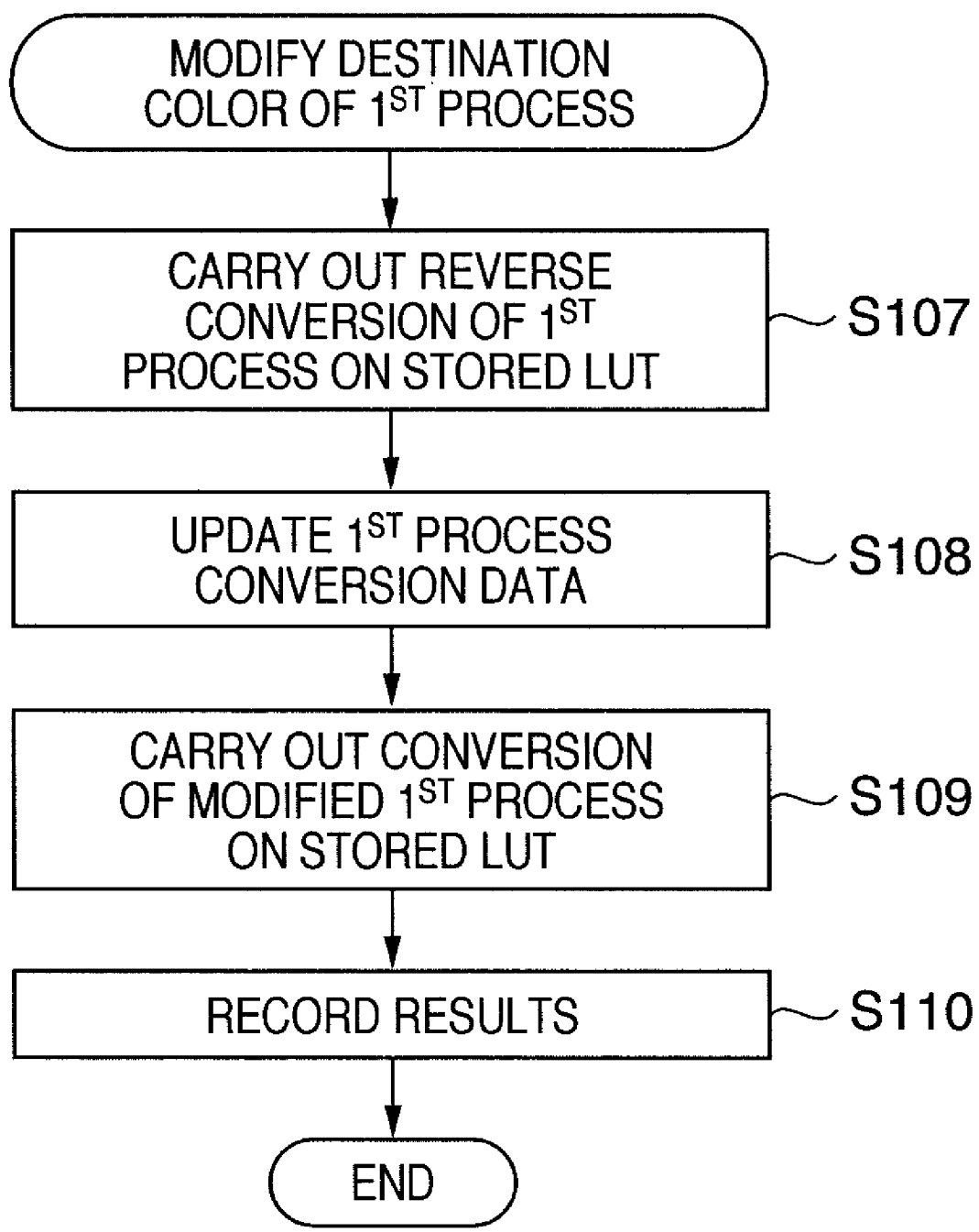

The flow chart shown in FIG. 10E shows a process in a case in which modification of the destination color of the first color conversion process is specified, in response to which the controller 1010 carries out the following process.

In this case, the active flag in the color correction history data remains valid ("1"). The controller 1010 carries out a reversion conversion of the first color conversion process on the LUT stored in the corrected conversion table data region 7002, invalidating once the first conversion (S107). Subsequently, the controller 1010 updates the color correction history data region 7004 conversion data destination color information to new destination color information (S108). The controller 1010 then carries out a color conversion of the first color conversion process with the changed destination color on the LUT computed in S107 (S109), and stores the results in the corrected conversion table data region 7002 (S110). The controller 1010 also updates the corrected image display part 3002 display. Thus the modification of the destination color of an already executed color conversion can be processed promptly.

Figures 11A, 11B:
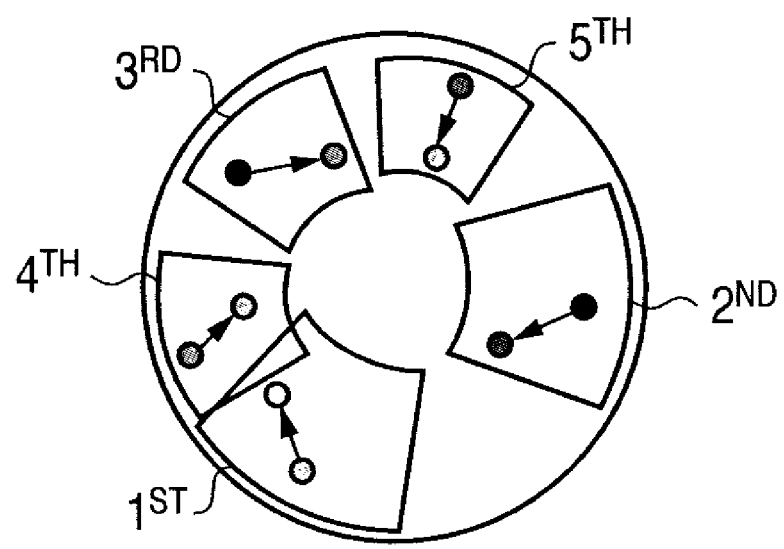
Figure 11D:
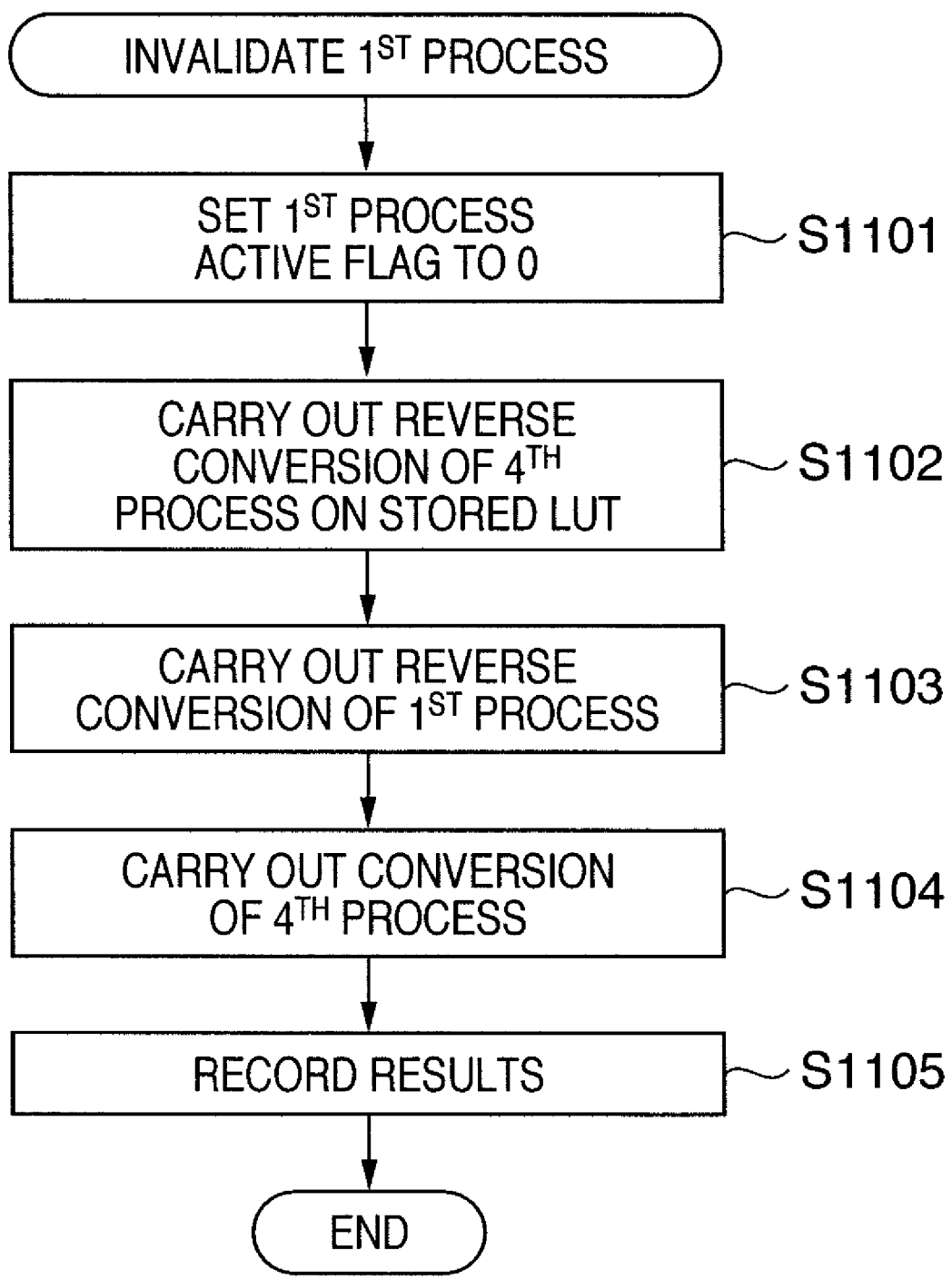
FIGS. 11D-11F are flow charts illustrating the process of an information processing apparatus according to an embodiment of the present invention.

A description is now given of a case in which a color conversion process having an overlap is present in the affected region, with reference to the example shown in FIGS. 11A-11F. FIG. 11A shows a correction history part 3004 in a case in which a fourth and a fifth color conversion have been further added to the state shown in FIGS. 10A and 10B.

FIG. 11B shows affected regions of the first through fifth color conversion processes on the color wheel 3005. As shown in FIG. 11B, the first affected region and the fourth affected region overlap.

At this time, the color correction history data is as shown in FIG. 11C, with "1" indicating overlap with the affected region for the first color conversion process stored in the correlated data for the fourth color conversion process color correction history data.

Under such conditions, a process in a case in which the first color conversion process is invalidated is described using the flow chart shown in FIG. 1D.

As with the process described using FIG. 10C, first, the controller 1010 sets the first color conversion process active flag to "0" (S1101). The controller 1010 then carries out a reverse conversion on the color conversion process last in order having an overlap with the affected region of the first color conversion process, in this case the fourth, on the LUT stored in the corrected conversion table data region 7002 (S1102). With the reverse conversion, the controller 1010 removes the effect of the fourth color conversion process whose affected region overlaps that of the first color conversion process, and subsequently, by carrying out reverse conversion of the first color conversion process, ultimately invalidates the first color conversion (S1103).

Then, after invalidating the first conversion, the fourth color conversion process is again carried out so as to reflect the fourth conversion (S1104). The results are recorded in the corrected conversion table data region 7002 (S1105). The controller 1010 also updates the corrected image display part 3002 display.

Thus, as described above, in a case in which other color conversion processes whose affected regions overlap the affected region of a color conversion process to be invalidated, first, that color conversion in whose correlated data is recorded the number of the color conversion to be invalidated is once invalidated. Subsequently, the color conversion process to be invalidated is invalidated, and the once-invalidated process is re-applied. In this manner, it is sufficient to re-apply only those processes whose affected regions overlap, and therefore, in a case in which the first process is invalidated in the example shown in FIGS. 11A-11F, whereas conventionally the subsequent second through fifth color conversion process are all re-applied, by contrast it is sufficient to re-apply only the fourth color conversion process. It should be noted that, although not shown, in the event that a sixth process overlaps the first process, the sixth process and the fourth process are reverse converted in that order, after which the fourth process and the sixth process are converted in that order and re-applied. In other words, color conversion processes determined to have affected regions that overlap the affected region of a color conversion process targeted for modification are once invalidated starting with the latest such process in the order of application. Then, after the color conversion process targeted for modification is invalidated, the once-invalidated color conversion processes are applied to the image starting with the earliest in the order of application, thus enabling processing time to be greatly reduced and processing load to be greatly decreased and also contributing to savings in memory capacity needed for processing.

Figure 11E:
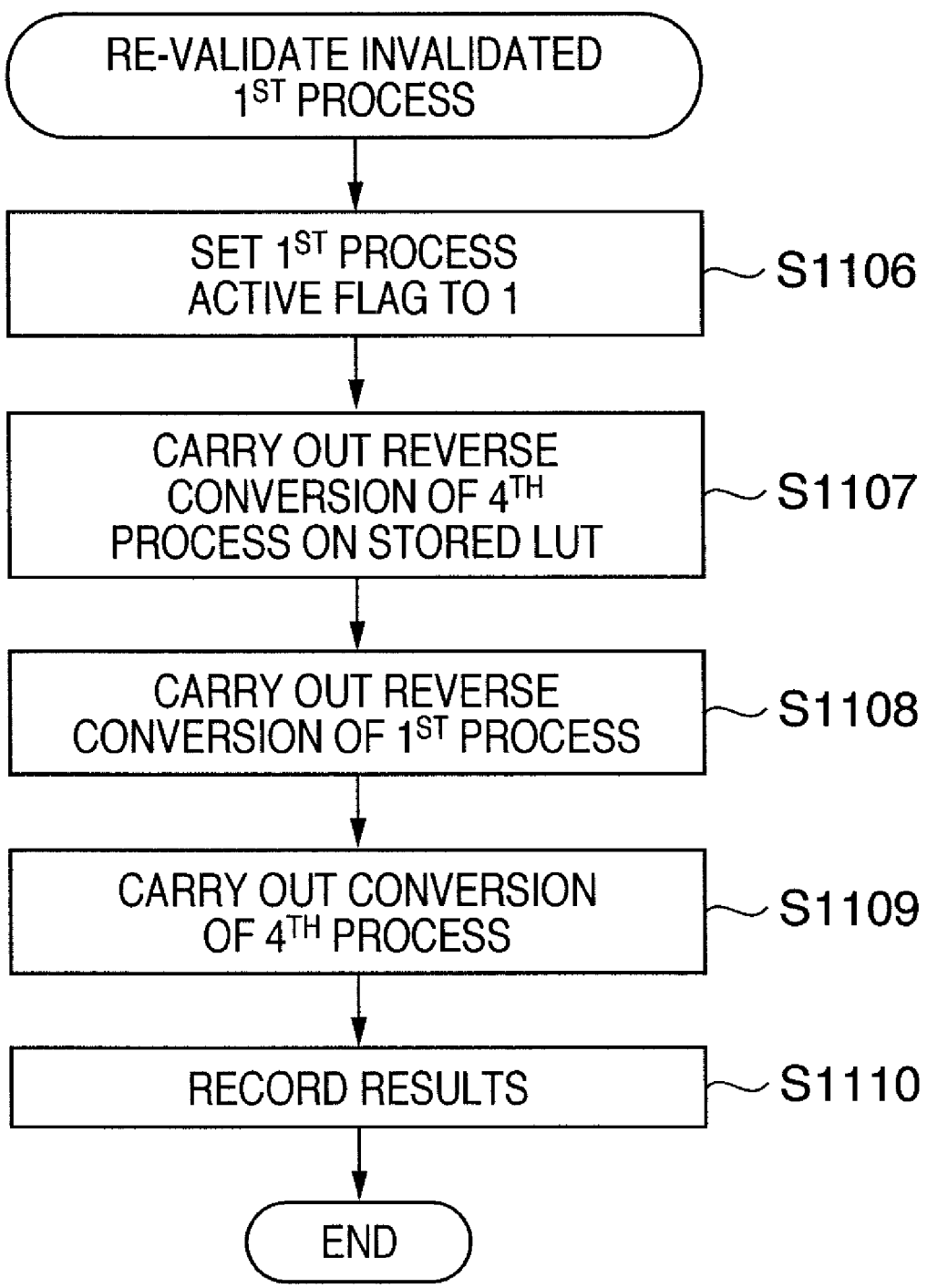

In a case in which the first color conversion process, which has been invalidated, is to be revalidated, the process shown in the flow chart shown in FIG. 11E may be carried out.

First, the controller 1010 sets the active flag of the first correction history data to "1" (S1106). The controller 1010 then carries out a reverse conversion of the fourth color conversion process in whose correlated data is recorded data indicating the first color conversion process to be validated on the LUT stored in the corrected conversion table data region 7002 (S1107).

Further, the controller 1010 carries out the first color conversion process on the results (S1108), and then carries out the fourth color conversion process (S1109). By recording the results (S1110) in the corrected conversion table data region 7002, an invalidated conversion can be validated. The controller 1010 also updates the corrected image display part 3002 display.

Figure 11F:
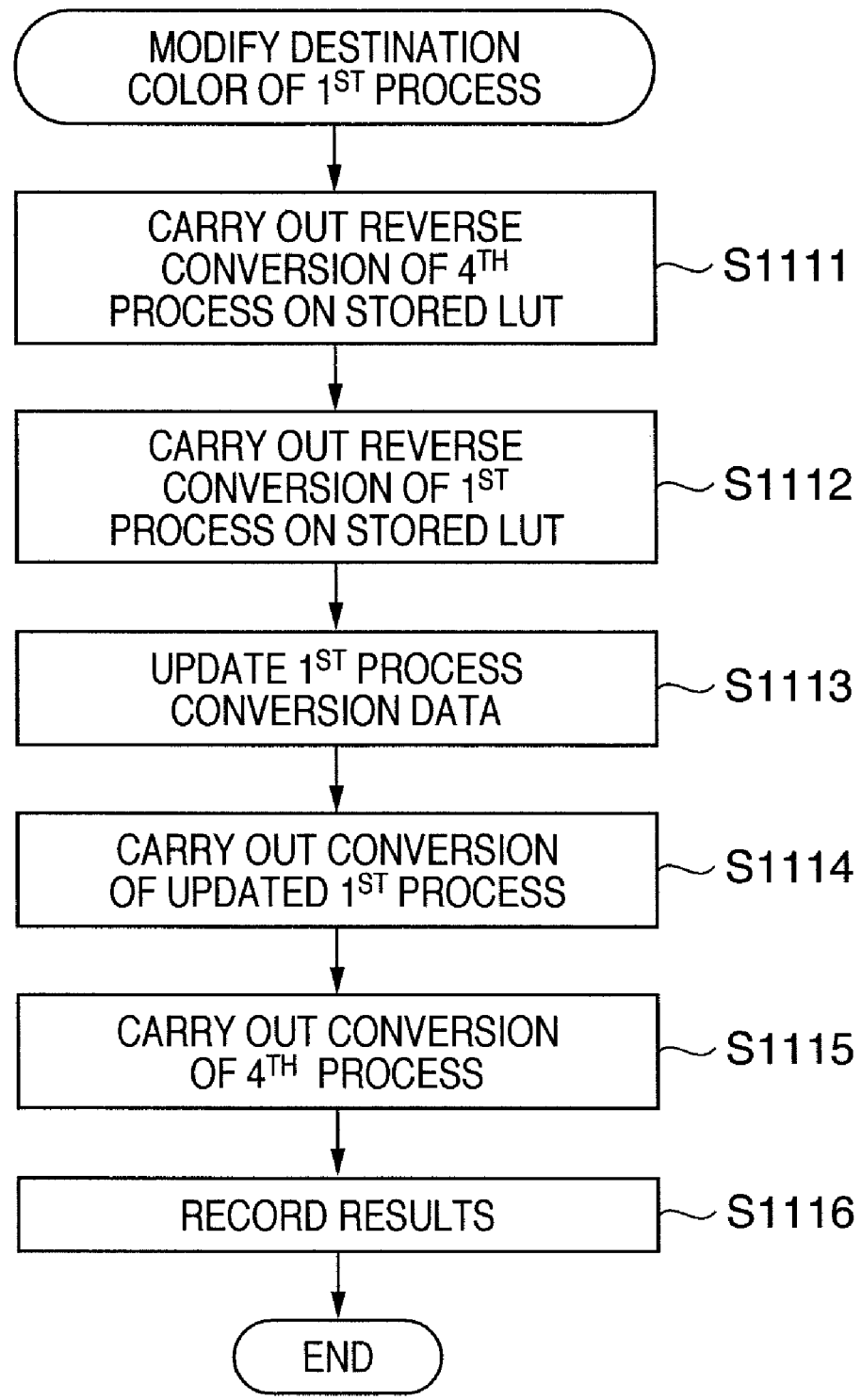

Further, a description is given of a process in a case in which the destination color of the first color conversion process is to be modified, using the flow chart shown in FIG. 11F.

First, the controller 1010 carries out a reverse conversion of the fourth color conversion process on the LUT recorded in the corrected conversion table data region 7002 (S1111). The controller 1010 then carries out a reverse conversion of the first color conversion process (S1112). Thus is the first process invalidated.

Subsequently, the controller 1010 updates the destination color in the conversion data of the color correction history data of the first color conversion process to the new destination color (S1113), and carries out the conversion process (S1114). Subsequently, the fourth color conversion process, which has been once invalidated, is carried out once again and validated (S1115), and the results stored in the LUT (S1116). Since it is sufficient to invalidate only those processes that are affected by the color conversion process for which the destination color has been modified, processing time can be greatly reduced and processing load can be greatly decreased, which also contributes to savings in the memory capacity needed for processing.

Up to this point, a description has been given of three modifications, namely, an "invalidation process", a "(re)validation process", and a "destination color modification process", using the specific examples shown in FIGS. 10A-10E and FIGS. 11A-11F.

Now, a more general description is given of the three modification processes described above.

Figure 12:
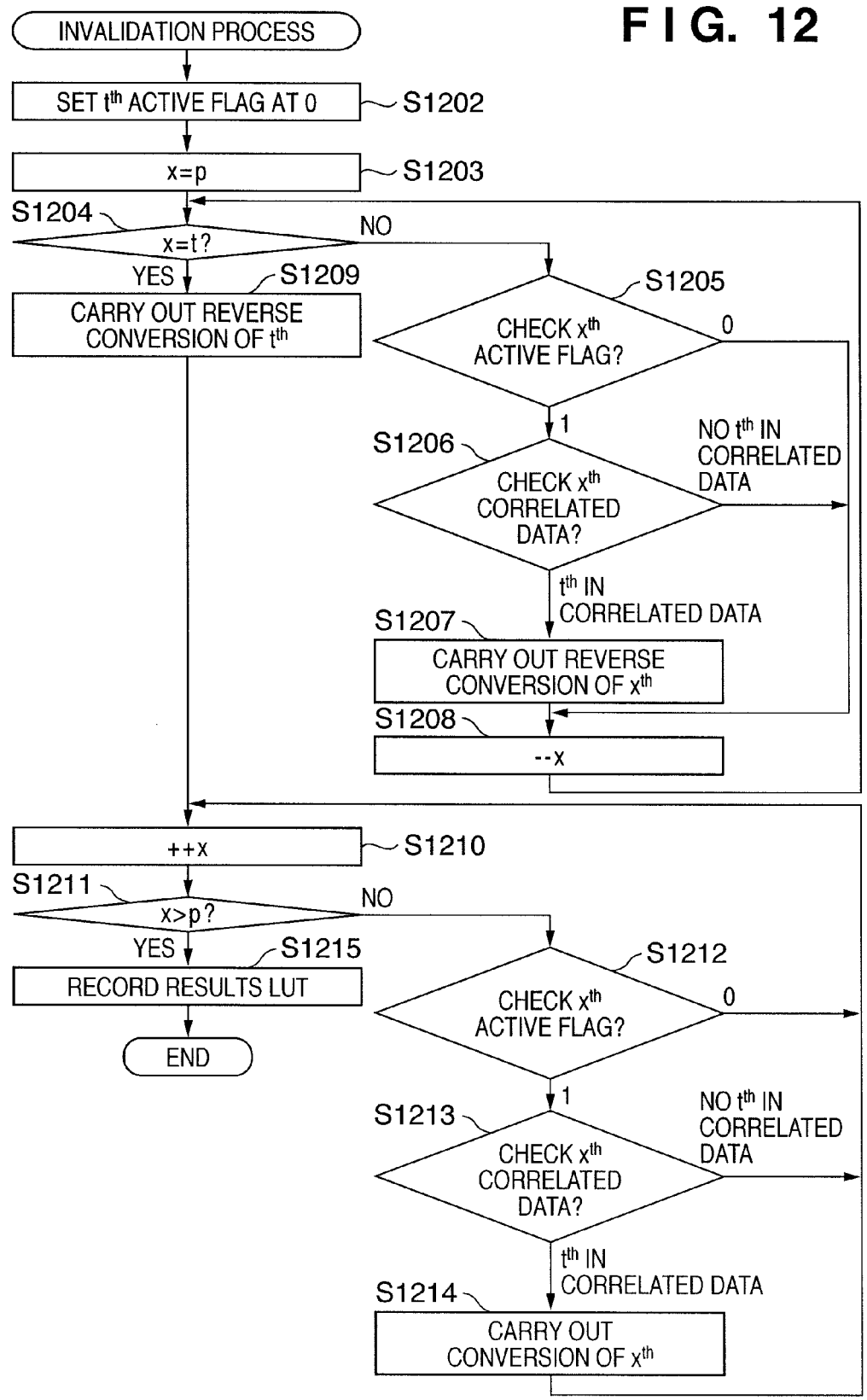
FIG. 12 is a flow chart illustrating an invalidation process in an information processing apparatus according to an embodiment of the present invention.

First, a flow chart of a generalized "invalidation process" is shown in FIG. 12.

In the following description, x represents an order variable and p represents a number of times the color conversion process has been carried out, with a $t^{th}$ ($1 \leq t \leq p$) modification being invalidated.

By un-checking the check box of the $t^{th}$ color conversion in the correction history part 3004, the user specifies invalidation. In response to the invalidation instruction, the controller 1010 starts the process shown in FIG. 12.

First, the controller 1010 changes the active flag of the $t^{th}$ color correction history data in the color correction history data region 7004 to "0" (S1202).

Next, the controller 1010 substitutes p for the order variable x (S1203). The controller 1010 then determines whether or not the $x^{th}$ modification is active while decrementing the value of the variable x by 1 each time, and further, determines whether or not a value for the $t^{th}$ modification is recorded in the correlated data.

If it is determined that a value for the $t^{th}$ modification is recorded in the correlated data, then the controller 1010 carries out a reverse conversion of the $x^{th}$ color conversion process on the LUT saved in the corrected conversion table data region 7002. This operation is repeated until x=t, that is, until the conversion to be invalidated is reached (S1204-S1208). The controller 1010 then carries out a reverse conversion of the $t^{th}$ color conversion process (S1209), invalidating the target $t^{th}$ modification.

Subsequently, the controller 1010 checks the active flag and the correlated data for each modification while incrementing the order variable x by one each time, and once again validates the color conversion processes that were once invalidated in S1207 (S1209-S1214). When x>p, that is, when the process returns to the last color conversion process p, the LUT at that time is recorded (S1215) and the process ends. Using the recorded LUT to convert to RGB as in S26 (of FIG. 2) to display the image on the display unit 1004 enables the user to visually confirm the conversions that have been carried out.

Figure 13:
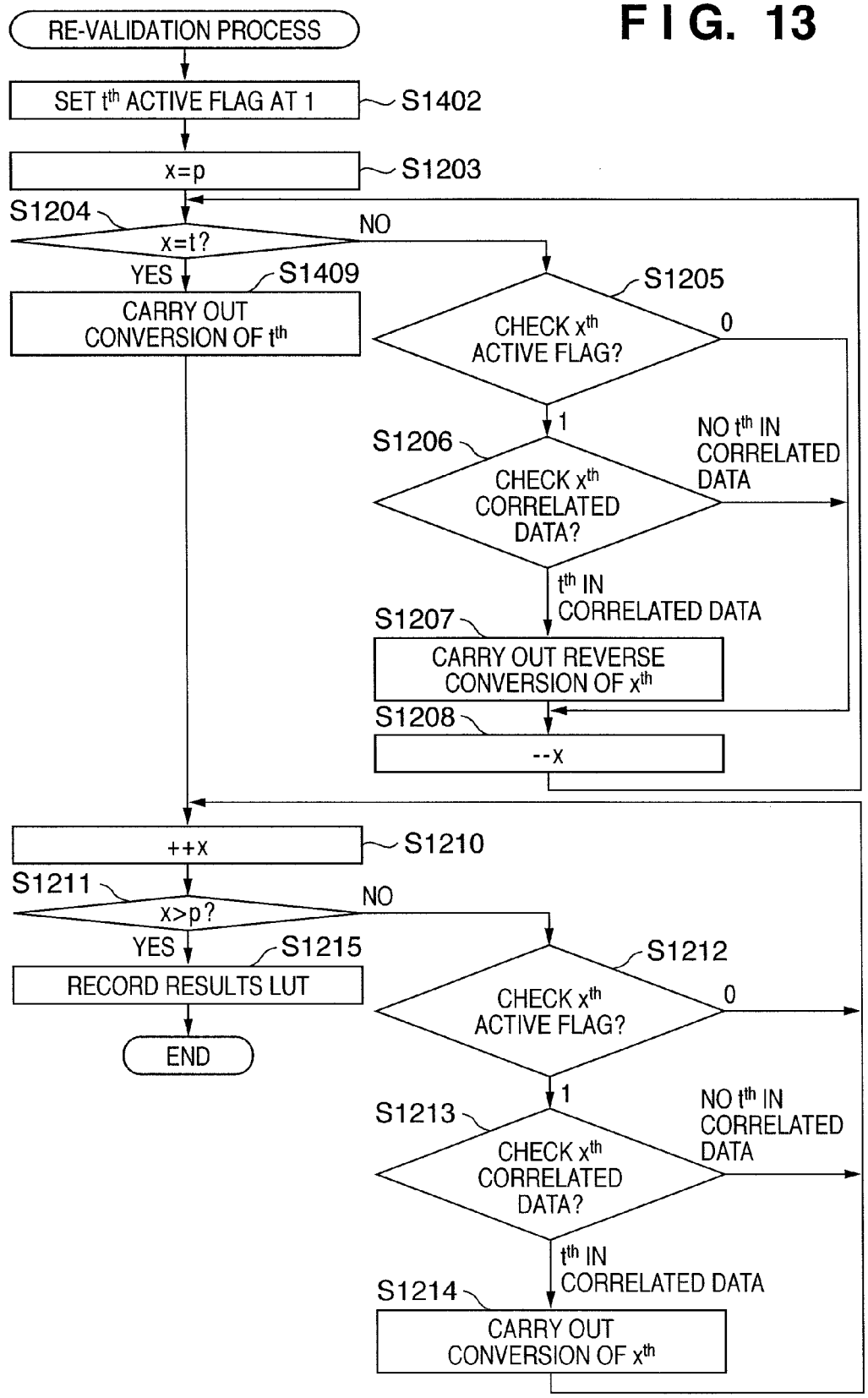
FIG. 13 is a flow chart illustrating a revalidation process in the information processing apparatus according to an embodiment of the present invention.
Figure 14:
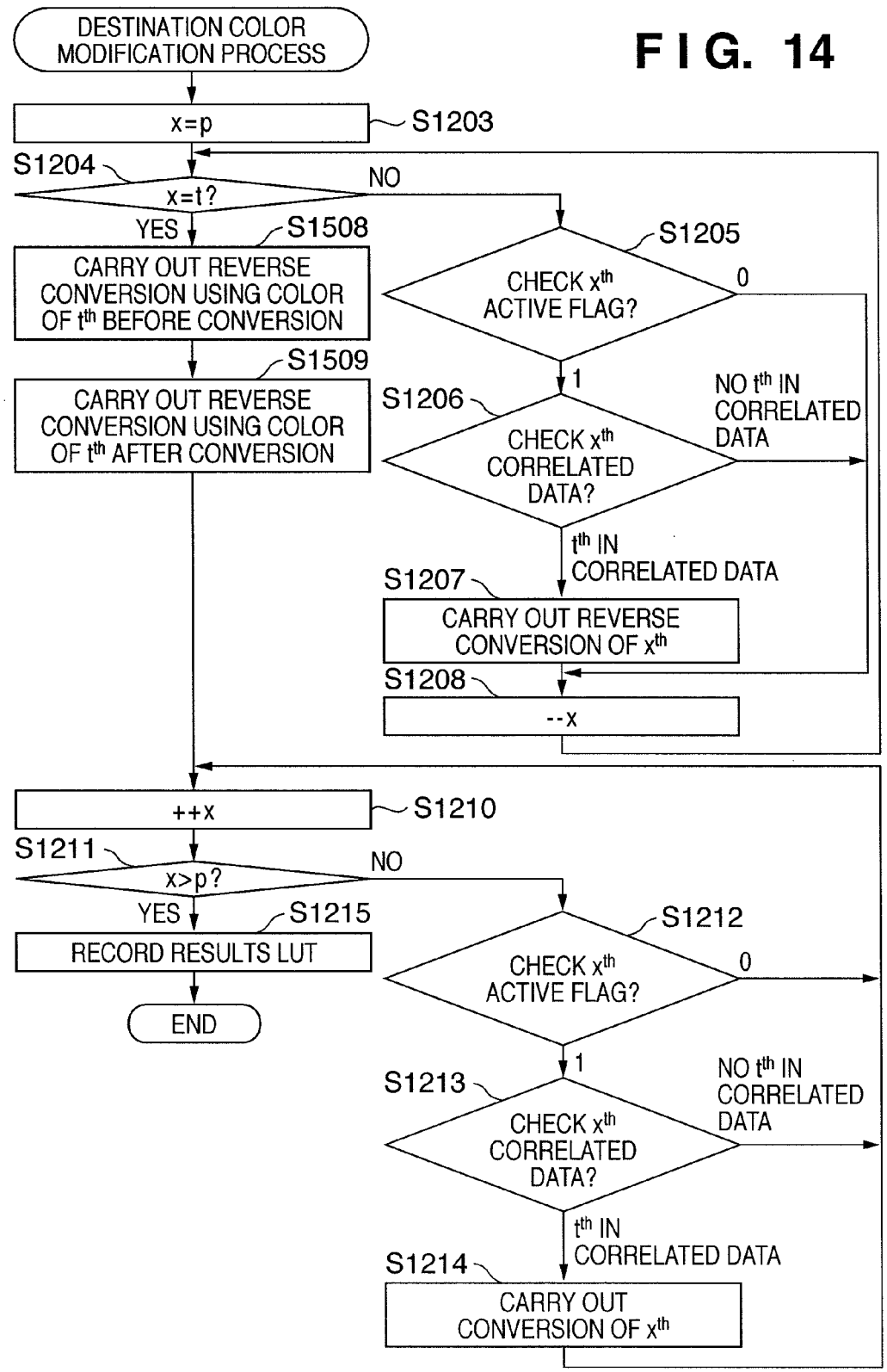
FIG. 14 is a flow chart illustrating a destination color conversion process in the information processing apparatus according to an embodiment of the present invention.

Flow charts of the "validation process" and the "destination color modification process" are shown in FIG. 13 and FIG. 14, respectively. The general process is substantially identical to the "invalidation process". Therefore, the same reference numerals are given to the same processes and descriptions thereof are not repeated. What follows is a description of the portions that differ from the "invalidation process".

In the "validation process" shown in FIG. 13, the controller 1010 returns the value for the active flag of the color correction history data of the color conversion to be revalidated to "1" (S1402). Then, the controller 1010 backtracks to the $t^{th}$ modification and carries out reverse conversions of, and once invalidates, those color conversion processes whose affected regions overlap (S1204-S1208). Subsequently, the controller 1010 carries out the $t^{th}$ conversion (S1409) and returns the once-invalidated modifications in order (S1210-S1214). Then, lastly, the controller 1010 records the resulting LUT (S1215).

In the "destination color modification process" shown in FIG. 14 there is no need to change the active flag, and therefore the controller 1010 backtracks to the $t^{th}$ modification to be converted as in the two processes described above (S1203-S1208). Then, the controller 1010 carries out a reverse conversion in order to invalidate the $t^{th}$ process (S1508), and thereafter carries out a conversion using a newly set destination color (S1509). Subsequently, the controller 1010 validates in order the conversions that were once invalidated (S1210-S1214), and finally records the resulting LUT (S1215).

Thus, as described above, the present embodiment, in a case in which a given color conversion process has been modified, invalidates and reapplies only those color conversion processes whose affected regions overlap the affected region of that modified color conversion process. Therefore, compared to a case in which all processes carried out after the modified process are unconditionally redone as is conventionally the case, processing time can be greatly reduced and processing load can be greatly decreased, thus contributing to savings in the memory capacity needed for processing.

Third Embodiment

A description is now given of an information processing apparatus according to a third embodiment of the present invention.

In the third embodiment as well, the functional configuration of the information processing apparatus may be the same as that of the information processing apparatus of the first embodiment shown in FIG. 1, and therefore a description thereof is not repeated.

The second embodiment is described as enabling a conversion to be invalidated by executing a reverse conversion. However, depending on the number of grid points in the LUT, it can happen that there can be no complete return to the pre-conversion state even with reverse conversion, and an error occurs. If the user desires very precise color conversion, such error cannot be ignored. In the present embodiment a description is given of a method that avoids error during reverse conversion.

The biggest difference between the present embodiment and the processes of the first and second embodiments is the LUT to be stored. In the above-described embodiments, what is stored in the corrected conversion table data region 7002 of the holding unit 1005 is only the last calculated and computed LUT. By contrast, in the third embodiment, all the LUT at each calculation result at every color conversion process are stored.

Figure 15:
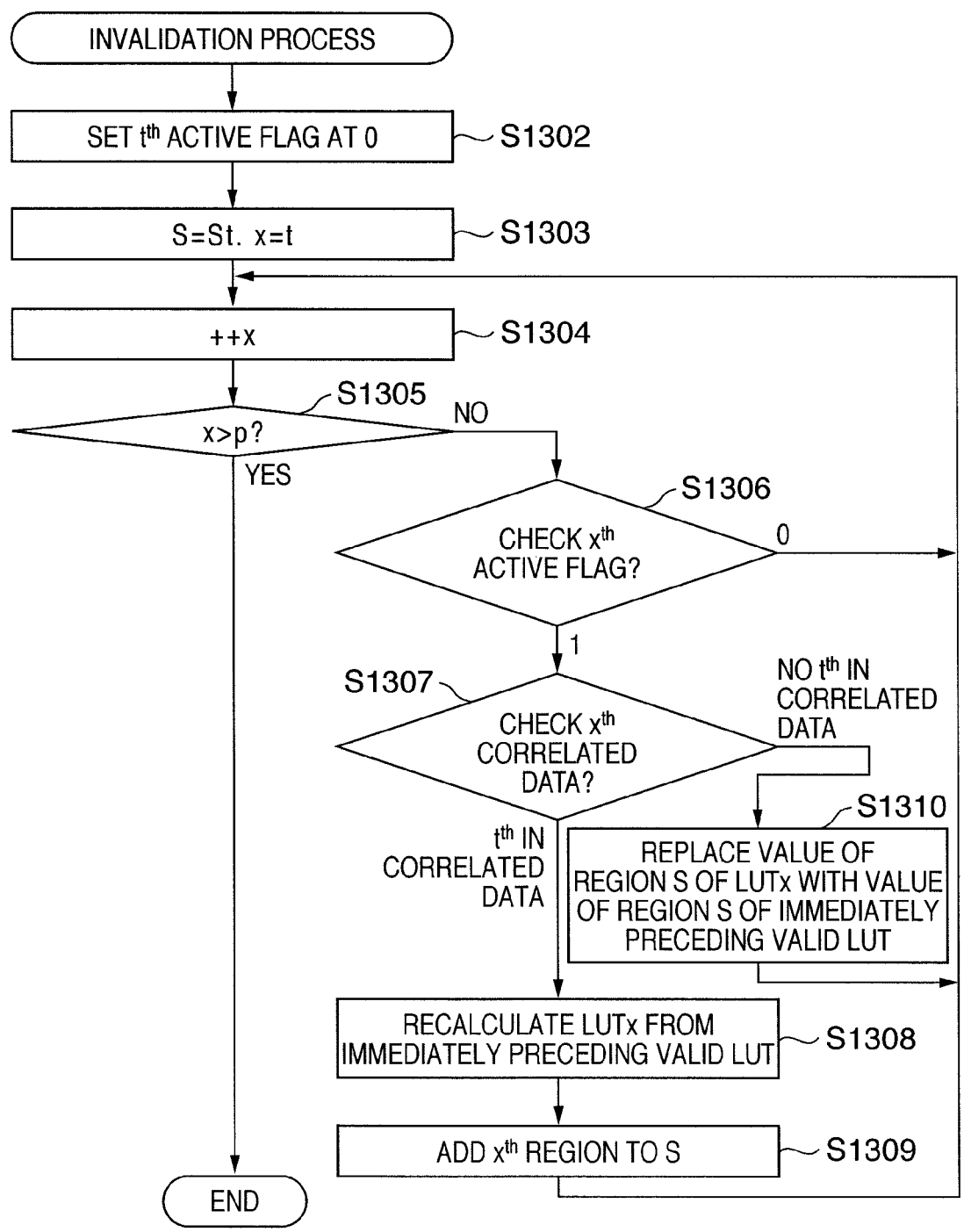
FIG. 15 is a flow chart illustrating an invalidation process in an information processing apparatus according to an embodiment of the present invention.

Using the flow chart shown in FIG. 15, a description is given of an "invalidation process" in the information processing apparatus of the present embodiment.

As with the second embodiment, by manipulating the correction history part 3004 and removing the check for the conversion process to be invalidated, the user issues an invalidation instruction, in response to which the controller 1010 starts to process. Here also the color conversion process has been carried out p times on the subjected image, in which state a $t^{th}$ color conversion process is to be invalidated.

The controller 1010 sets the active flag for the color correction history data of the $t^{th}$ color conversion process specified for invalidation to "0" (S1302).

Subsequently, the controller 1010 initializes the parameters. First, an affected region St of the color conversion process to be invalidated is substituted for a region A indicating the converted region. In addition, t, indicating the order of the color conversion process that is to be invalidated, is substituted for the variable x indicating the order (S1303). Then, the controller 1010 increments the variable x and moves to the next process in the order (S1304).

At this point, if x>p (S1305, YES), the controller 1010 ends the process (S1310). If x is not >p (S1305, NO), the controller 1010 first checks the correction history data active flag and determines whether or not the $x^{th}$ color conversion process is valid (S1306). If invalid, the controller 1010 returns to S1304 and moves to the next process in the order.

If the $x^{th}$ color conversion process is valid, the controller 1010 checks the correlated data for the $x^{th}$ correction history data (S1307) and determines whether or not information indicating the $t^{th}$ color conversion process to be invalidated is recorded therein.

If information indicating the $t^{th}$ color conversion process is recorded, then LUTx, which is the LUT used in the $x^{th}$ process, must be recalculated and computed. As a result, the controller 1010 carries out a recalculation from the LUT for the closest valid color conversion process applied prior to the color conversion process in question (since there is a possibility that the $x^{th}$-1 LUTx-1 is not valid), and computes the LUTx (S1308).

In carrying out recalculation, a region R of the LUT that changes with the invalidation of the $t^{th}$ color conversion process becomes one in which a region Sx of the recalculated LUTx is added to the affected region St of the $t^{th}$ color conversion process (S1309).

By contrast, if there is no information indicating the $t^{th}$ color conversion process in the correlated data for the $x^{th}$ correction history data, the controller 1010 replaces the value in the region S of the LUTx with the value of the region S of the LUT for the closest valid color conversion process applied prior to the color conversion process in question, enabling an earlier color conversion process than the color conversion process in question to be reflected in the LUTx in question (S1310).

Specifically, by copying the appropriate region of the LUT of the immediately preceding valid color conversion process without recalculating the color conversion processes whose affected regions do not overlap the affected region of the $t^{th}$ color conversion process, past conversion results can be reflected in the LUT. By repeating this until x becomes >p, an LUT that reflects all conversions can be generated. By applying the last LUT generated to the original image, an image that reflects the invalidation is generated.

Figure 16:
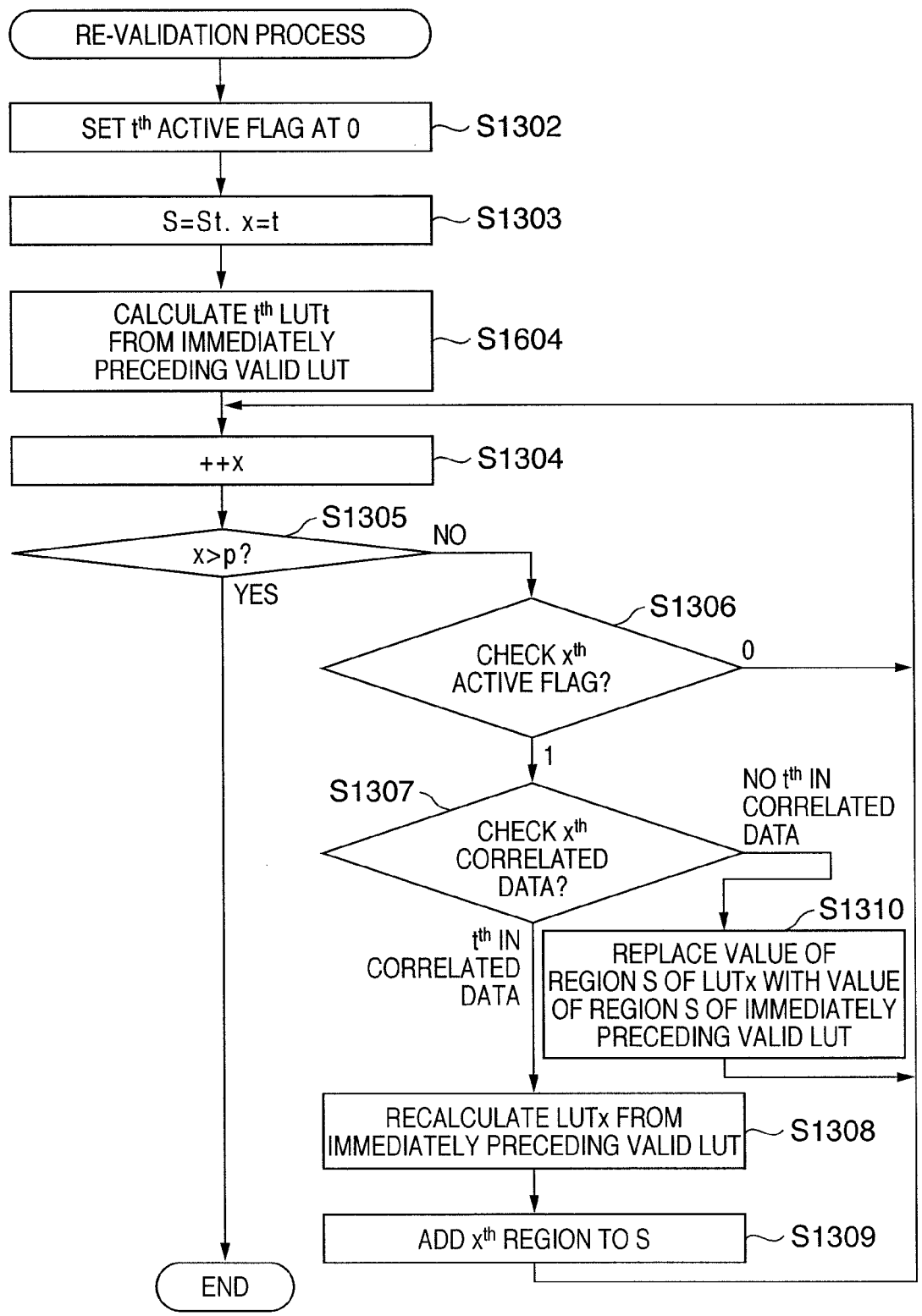
FIG. 16 is a flow chart illustrating a revalidation process in the information processing apparatus according to an embodiment of the present invention.
Figure 17:
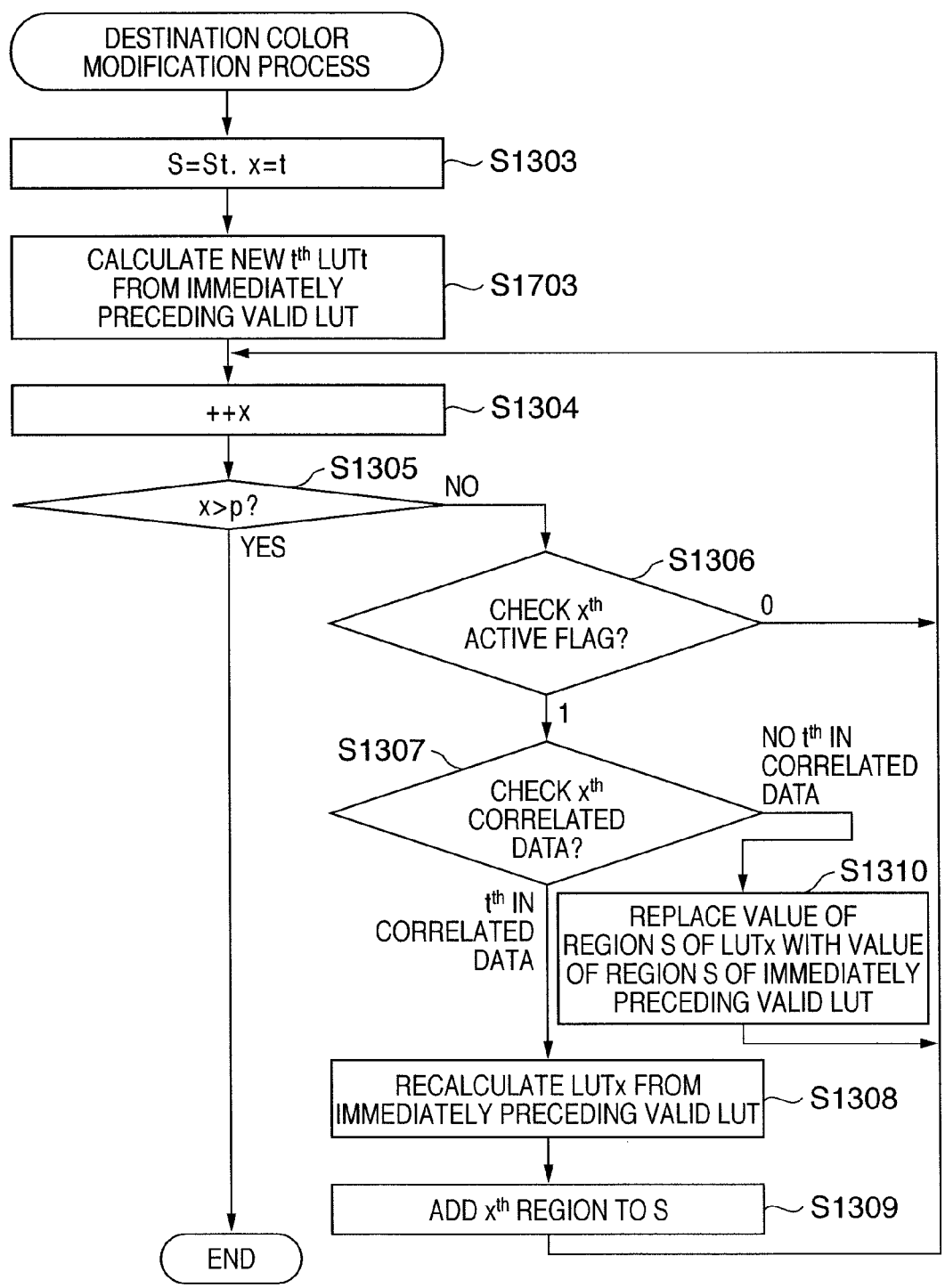
FIG. 17 is a flow chart illustrating a destination color conversion process in the information processing apparatus according to an embodiment of the present invention.

Further, using the flow charts shown in FIGS. 16 and 17, as with the description of the second embodiment, a concise description is given of the portions that differ from the "invalidation process", the "destination color modification process", and further, the above-described "invalidation process".

FIG. 16 shows a flow chart illustrating the "validation process".

The only difference between the "validation process" shown in FIG. 16 and the "invalidation process" shown in FIG. 15 is the addition of S1604 between S1302 and S1303 in the "validation process". Conversion that revalidates an invalidated process requires not a calling up of the LUTt of the $t^{th}$ color conversion process stored previously but recalculation and computation from the LUT for the closest valid color conversion process applied prior to the color conversion process in question. In S1604, the controller 1010 carries out this recalculation process.

This recalculation is necessary because, in a case in which new color conversion processes have been modified after the $t^{th}$ color conversion process was invalidated and before it is validated once again, there is a possibility that the stored LUTt does not reflect the effects of those modifications.

The remaining processes are the same as those described with reference to FIG. 15, and therefore a description thereof is not repeated.

Similarly, in the "destination color modification process" shown in FIG. 17, there is no need to change the $t^{th}$ flag, and the process can be implemented by carrying out S1703 instead of S1604 in the "validation process" shown in FIG. 16.

In S1703, the controller 1010 computes the LUT of the color conversion process that uses the newly specified destination color from the LUT for the closest valid color conversion process applied prior to the color conversion process in question.

The technique of the present embodiment records the LUT at each conversion process. As a result, compared to the second embodiment, the memory capacity required for processing increases and moreover the modification proceeds while the LUT is updated, with the result that processing speed is likely to be slightly slower where there are few overlaps of affected regions.

However, since errors during reverse conversion do not occur as they might in the second embodiment, the third embodiment is very effective in cases in which conversion accuracy is sought. Further, since the present embodiment records LUT for all conversions, it is also possible to add a function that, by checking one color conversion LUT, invalidates all conversions subsequent to that color conversion.

Other Embodiments

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-053338, filed on Mar. 2, 2007, which is hereby incorporated by reference herein in its entirety.

What is claimed is:

1. An information processing apparatus for applying, to an image, a color conversion process that converts a source color to a destination color, comprising:
   a computing unit that computes an affected region that is a region of color converted together with conversion of the source color;
   a color conversion unit that uses a processor to apply the color conversion process to the image;
   a storage unit that stores information relating to an affected region of a color conversion process that has already been applied to the image;
   a discrimination unit that, using the storage unit and the computing unit, determines whether an affected region of the color conversion process that has already been applied and an affected region of a color conversion process to be applied overlap; and
   a notification unit that, in a case in which it is determined that an affected region of the color conversion process that has already been applied and an affected region of a color conversion process to be applied overlap, informs a user that an overlap has been determined.

2. The information processing apparatus according to claim 1, wherein the notification unit carries out such notification by displaying on a chromaticity diagram an affected region of the color conversion process to be applied and, from among affected regions of the color conversion processes that have already been applied, the affected region that has been determined to overlap the affected region of the color conversion process to be applied.

3. The information processing apparatus according to claim 2, wherein the notification unit displays the affected regions in a way that the user can modify the affected regions.

4. An information processing apparatus for applying, to an image, a color conversion process that converts a source color to a destination color, comprising:
   a computing unit that computes an affected region that is a region of color converted together with conversion of the source color;
   a storage unit that stores information relating to an affected region of a color conversion process that has already been applied to the image;
   a discrimination unit that, in response to an instruction to modify the color conversion process that has already been applied to the image, uses the storage unit and determines whether there is a color conversion process having an affected region that overlaps an affected region of a color conversion process that is to be subjected to the modification; and
   a control unit that reflects the instruction in the image by using a processor to apply a color conversion process to the image based only on calculations relating to the color conversion process that is to be subjected to the modification and to a color conversion process that is determined to have an affected region that overlaps the affected region of the color conversion process that is to be subjected to the modification.

5. The information processing apparatus according to claim 4, wherein the control unit, in a case in which the color conversion process modification is invalidation, once invalidates color conversion processes that are determined to have affected regions that overlap the affected region of the color conversion process that is to be subjected to the modification in reverse order of application, and after invalidating the color conversion process that is to be subjected to the modification, applies the once-invalidated color conversion processes to the image in order of application.

6. The information processing apparatus according to claim 4, wherein the control unit, in a case in which the color conversion process modification is validation, once invalidates color conversion processes that are determined to have affected regions that overlap the affected region of the color conversion process that is to be subjected to the modification in reverse order of application, and after applying the color conversion process that is to be subjected to the modification to the image, applies the once-invalidated color conversion processes to the image in order of application.

7. The information processing apparatus according to claim 4, wherein the control unit, in a case in which the color conversion process modification is modification of destination color, once invalidates color conversion processes that are determined to have affected regions that overlap the affected region of the color conversion process that is to be subjected to the modification in reverse order of application, and after invalidating the color conversion process that is to be subjected to the modification, modifying the destination color of the color conversion process that is to be subjected to the modification and applying to the image, applies the once-invalidated color conversion processes to the image in order of application.

8. The information processing apparatus according to claim 4, wherein:
the storage unit further stores a single look-up table that reflects all the color conversion processes that have already been applied to the image; and
the control unit executes invalidation of a color conversion process that has already been applied to the image by applying a reverse conversion of such color conversion process on the look-up table.

9. The information processing apparatus according to claim 4, wherein the storage unit further stores a look-up table at each result of the color conversion process applied to the image.

10. The information processing apparatus according to claim 9, wherein the control unit updates a look-up table for a color conversion process that has already been applied after the color conversion process that is to be subjected to the modification using a look-up table for a closest valid color conversion process applied prior to the color conversion process that is to be subjected to the modification, and reflects the modification in the image using a look-up table for results of a last valid color conversion process that has already been applied.

11. The information processing apparatus according to claim 10, wherein the control unit updates a look-up table for a result of a color conversion process that is determined to have an affected region that overlaps an affected region of the color conversion process that is to be subjected to the modification by recalculation from a look-up table for a closest valid color conversion process applied prior to the color conversion process that is to be subjected to the modification,
and updates a look-up table for a result of a color conversion process that is determined not to have an affected region that overlaps an affected region of the color conversion process that is to be subjected to the modification by replacement with a portion for the affected region of a look-up table for a closest valid color conversion process applied prior to the color conversion process that is to be subjected to the modification.

12. An information processing method for applying, to an image, a color conversion process that converts a source color to a destination color, comprising:
computing an affected region that is a region of color converted together with conversion of the source color;
applying the color conversion process to the image using a processor;
storing information relating to an affected region of a color conversion process that has already been applied to the image in a storage unit;
using the information relating to the affected region stored in the storage unit and the computed affected region of a color conversion process to be applied and determining whether the affected region of the color conversion process that has already been applied and the affected region of the color conversion process to be applied overlap; and
informing a user that, in a case in which it is determined that the affected region of the color conversion process that has already been applied and the affected region of the color conversion process to be applied overlap, an overlap has been determined.

13. An information processing method for applying, to an image, a color conversion process that converts a source color to a destination color, comprising:
computing an affected region that is a region of color converted together with conversion of the source color;
storing information relating to an affected region of a color conversion process that has already been applied to the image in a storage unit;
in response to an instruction to modify the color conversion process that has already been applied to the image, using the storage unit and determining whether there is a color conversion process having an affected region that overlaps an affected region of a color conversion process that is to be subjected to the modification; and
reflecting the instruction in the image by using a processor to apply a color conversion process to the image based only on calculations relating to the color conversion process that is to be subjected to the modification and to a color conversion process that is determined to have an affected region that overlaps the affected region of the color conversion process that is to be subjected to the modification.

14. A non-transitory computer-readable recording medium having stored thereon computer-executable instructions, for causing a computer to perform an information processing method for applying, to an image, a color conversion process that converts a source color to a destination color, comprising:
computing an affected region that is a region of color converted together with conversion of the source color;
applying the color conversion process to the image;
storing information relating to an affected region of a color conversion process that has already been applied to the image in a storage unit;
using the information relating to the affected region stored in the storage unit and the computed affected region of a color conversion process to be applied and determining whether the affected region of the color conversion process that has already been applied and the affected region of the color conversion process to be applied overlap; and
informing a user that, in a case in which it is determined that the affected region of the color conversion process that has already been applied and the affected region of the color conversion process to be applied overlap, an overlap has been determined.

* * * * *